United States Patent
Perthold et al.

(10) Patent No.: US 9,063,215 B2
(45) Date of Patent: Jun. 23, 2015

(54) METHOD AND SYSTEM FOR DETERMINING A TIME DIFFERENCE, METHOD AND SYSTEM FOR FINDING A POSITION OF A TRANSMITTER

(71) Applicant: Innovationszentrum fuer Telekommunikationstechnik GmbH IZT, Erlangen (DE)

(72) Inventors: Rainer Perthold, Weisendorf (DE); Dieter Weninger, Markt Erlbach (DE)

(73) Assignee: Innovationszentrum fuer Telekommunikationstechnik GmbH IZT, Erlangen (DE)

( * ) Notice: Subject to any disclaimer, the term of this patent is extended or adjusted under 35 U.S.C. 154(b) by 259 days.

(21) Appl. No.: 13/723,362

(22) Filed: Dec. 21, 2012

(65) Prior Publication Data
US 2013/0106657 A1 May 2, 2013

Related U.S. Application Data

(63) Continuation of application No. PCT/EP2010/059088, filed on Jun. 25, 2010.

(51) Int. Cl.
G01S 5/04 (2006.01)
G01S 5/02 (2010.01)
G01S 5/06 (2006.01)

(52) U.S. Cl.
CPC . *G01S 5/04* (2013.01); *G01S 5/021* (2013.01); *G01S 5/06* (2013.01)

(58) Field of Classification Search
USPC ............. 342/357.21, 387, 442, 444, 445; 701/468, 470
See application file for complete search history.

(56) References Cited

U.S. PATENT DOCUMENTS

| | | | |
|---|---|---|---|
| 5,724,047 | A | 3/1998 | Lioio et al. |
| 6,091,362 | A | 7/2000 | Stilp et al. |
| 2008/0316105 | A1 | 12/2008 | Seong et al. |

FOREIGN PATENT DOCUMENTS

WO 2007/067007 A1 6/2007

OTHER PUBLICATIONS

Official Communication issued in International Patent Application No. PCT/EP2010/059088, mailed on Oct. 26, 2010.
Ostermann, "Angewandte Mathematik für Lehramtsstudierende", Universität Innsbruck, Institut Mathematik, Skriptum zur Vorlesung im Sommersemester 2008.
Press et al., Numerical Recipes in C. Cambridge University Press, Second Edition 2002.

*Primary Examiner* — Dao Phan
(74) *Attorney, Agent, or Firm* — Keating & Bennett, LLP

(57) ABSTRACT

A method for determining a time difference between a first and a second time of arrival of the signal is described, the method including: receiving a first representation of the signal at the first time of arrival; receiving a second representation of the signal at the second time of arrival; correlating at least a first time-domain representation of the signal and a second time-domain representation of the signal to obtain a first time difference information; evaluating a phase difference relation between a first frequency-domain representation of the signal and a second frequency-domain representation of the signal to obtain a second time difference information; and determining the time difference between the first and the second time of arrival of the signal based on the first and the second time difference information, or based on a time difference information derived from the first time difference information and the second time difference information.

20 Claims, 16 Drawing Sheets

METHOD AND SYSTEM FOR DETERMINING A TIME DIFFERENCE, METHOD AND SYSTEM FOR FINDING A POSITION OF A TRANSMITTER

CROSS-REFERENCE TO RELATED APPLICATIONS

This application is a continuation of copending International Application No. PCT/EP2010/059088, filed Jun. 25, 2010, which is incorporated herein by reference in its entirety.

BACKGROUND OF THE INVENTION

Embodiments according to the present invention relate to methods and systems for determining a time difference (TDOA—Time Difference of Arrival) between a first time of arrival (TOA—Time of Arrival) of a signal and a second time of arrival (TOA) of the signal, and TDOA-based methods and systems for finding a position of the transmitter transmitting the signal.

The importance of radio direction-finding (DF) or position-finding (PF) technologies for navigation purposes is decreasing due to the omni-present availability of satellite navigation systems, for example GPS (Global Positioning System). Simultaneously, with an increasing mobility of communication means, the necessity increases to determine the positions of such communication means or any other transmitters or emitters. There is a series of fields of applications for direction-finding or position-finding technologies: (a) radio monitoring according to the guidelines of the ITU (International Telecommunications Union) for position determination of non-authorized transmitters or for the search of interference signals; (b) military reconnaissance, for example, for detecting activities of potential enemies or determining their position; and (c) security services, for example, for detecting radio communication of criminal organizations.

Today, a plurality of different direction- or position-finding methods exist. A good direction- or position-finding method is characterized by fulfilling as many of the following requirements as possible (see Carl-Cranz-Gesellschaft e.V.: Funkortung, Funkerfassung, Seminar FA 1.05, Oberpfaffenhofen, near Munich, 27-30 May 2008, in the following referred to as [6]: 1. high accuracy, 2. great sensitivity, 3. sufficient large signal strength, 4. immunity against distortions of the received fields due to multi-path propagation, 5. immunity against polarization rotations, 6. determination of the elevation in the short-wave range, 7. stable performance at non-coherent co-channel interferers, 8. short admissible signal duration, 9. high search speed and detection probability, 10. low costs, 11. simple operability, and 12. high flexibility.

There is no direction- or position-finding method, which combines all requirements in an optimum symbioses. In the following, as an example, some advantages and disadvantages of conventional direction- or position-finding methods are described.

The direction-finding with a directional antenna has the advantages of: high sensitivity due to antenna gain; low realization effort, only one receive train is necessitated; resolution of multi-wave fields possible; and direction finding and monitoring possible with the same antenna. The disadvantages are: detection probability reciprocal to directivity and rotating speed and only limited application for short-term signals.

Direction-finding based on the Watson-Watt principle has the advantages of: short signal duration sufficient, simple realization, and low space requirement. The disadvantages are: errors at multi-path propagation, and high direction-finding errors with sky-wave reception at steep elevation angles.

Doppler direction finders have the advantages of: high immunity against multi-path reception, and high sensitivity. The disadvantages are: high time requirements for gaining a direction-finding value and limited suitability for short-time signals in the VHF (Very High Frequency) and the UHF (Ultra High Frequency) range.

The direction-finding using correlation interferometers has the advantages of: high accuracy and sensitivity, polarization proof, and easy to be realized with digital signal processing. The disadvantages are: great space requirements for short waves.

A further method for determining a position of an object is hyperbola positioning, also referred to as multi-lateration positioning. The location of the target object is determined by computing the time difference of arrival (TDOA) of a signal emitted from that object to three or more receivers. As the distance between the object and the receivers is proportional to the propagation time of the signal transmitted from the object to the transceivers, the difference of the individual arrival times at the receivers can be used to determine, for each receiver pair, a respective time difference for the arrival or reception times, which again can be used to determine a hyperbola that represents possible locations of the transmitter with regard to the receivers of the corresponding receiver pair. By using at least two or more receiver pairs and their corresponding hyperbolas, the position of the transmitter can be determined. A typical solution to calculate the time difference for a receiver pair is to use a correlation of the signals received at the receivers of the receiver pair. The temporal resolution for a conventional correlation, however, is limited to a sample period. As the accuracy of the TDOA based position determination increases, e.g. with the temporal resolution of the correlation, typically interpolation filters are used to obtain finer temporal resolutions of the time difference in case the sample period is limited. However, the choice of the interpolation filter influences the calculation of the time difference so that depending on the choice of the interpolation filters, different time differences and different hyperbolas are obtained.

Therefore, there is a need to provide an efficient and accurate possibility to determine the time difference of signals originating from the same source to perform a position detection of the source.

However, the need for efficiently determining an accurate time difference of two representations of the same signal is not only limited to applications like position detection, but may also be used in other areas, where a difference of reception times of two representations of a signal at two different receivers or at the same receiver needs to be determined.

SUMMARY

According to an embodiment, a method for determining a time difference between times of arrival of signals at a first receiver and at a second receiver, wherein the first receiver and the second receiver are positioned at different locations, may have the steps of: receiving a first representation of a first signal at a first time of arrival at the first receiver; receiving a second representation of the first signal at a second time of arrival at the second receiver; correlating at least a first time-domain representation of the first signal derived from the first representation of the first signal and a second time-domain representation of the first signal derived from the second representation of the first signal to obtain a first time difference information or correlating at least a first time-domain representation of a second signal derived from a first representation of the second signal received at the first receiver at a third time of arrival and a second time-domain representation of the second signal derived from a second representation of the second signal received at the second receiver at a fourth time of arrival, to obtain the first time difference information; evaluating a phase difference relation between at least a first frequency-domain representation of the first signal derived from the first representation of the first signal and a second frequency-domain representation of the first signal derived from the second representation of the first signal to obtain a second time difference information; and determining the time difference between the first time of arrival of the first signal and the second time of arrival of the first signal based on the first time difference information and the second time difference information, or determining the time difference between the third time of arrival of the second signal and the fourth time of arrival of the second signal based on the first time difference information and the second time difference information, if the first time difference information is obtained by correlating the first and second time-domain representations of the second signal.

According to another embodiment, a system for determining a time difference between times of arrival of signals at a first receiver and at a second receiver, wherein the first and the second receivers are positioned at different locations, may have: the first receiver adapted to receive a first representation of a first signal at a first time of arrival; the second receiver adapted to receive a second representation of the first signal at a second time of arrival; and a central unit adapted to: correlate at least a first time-domain representation of the first signal derived from the first representation of the first signal and a second time-domain representation of the first signal derived from the second representation of the first signal to obtain a first time difference information or correlate at least a first time-domain representation of a second signal derived from a first representation of the second signal received at the first receiver at a third time of arrival and a second time-domain representation of the second signal derived from a second representation of the second signal received at the second receiver at a fourth time of arrival, to obtain the first time difference information; evaluate a phase difference relation between at least a first frequency-domain representation of the first signal derived from the first representation of the first signal and a second frequency-domain representation of the first signal derived from the second representation of the first signal; and determine the time difference between the first time of arrival of the first signal and the second time of arrival of the first signal based on the first time difference information and the second time difference information, or determining the time difference between the third time of arrival of the second signal and the fourth time of arrival of the second signal based on the first time difference information and the second time difference information, if the first time difference information is obtained by correlating the first and second time-domain representations of the second signal.

According to another embodiment, a method for finding a position of a transmitter transmitting a signal, may have the steps of: using the above-stated method to determine the time difference between times of arrival of representations of a signal at the first receiver and the second receiver; using the above-stated method, wherein the second receiver is replaced by a third receiver, to determine the time difference between times of arrival of representations of the signal at the first receiver and the third receiver; and finding the position of the transmitter by performing a multi-lateration algorithm using the time difference between the times of arrival of representations of the signal at the first receiver and the second receiver and the time difference between the times of arrival of representations of the signal at the first receiver and the third receiver.

According to another embodiment, a system for finding a position of a transmitter transmitting a signal may have: an above-stated system adapted to determine the time difference between times of arrival of representations of a signal at the first receiver and the second receiver and adapted to determine the time difference between times of arrival of representations of the signal at the first receiver and a third receiver, wherein the central unit is further adapted to find the position of the transmitter by performing a multi-lateration algorithm using the time difference between the times of arrival of representations of the signal at the first receiver and the second receiver and the time difference between the times of arrival of the representations of the signal at the first receiver and the third receiver.

Another embodiment may have a computer program for performing, when running on a computer or a processor, an inventive method.

Embodiments according to the present invention are based, on the one hand, on the finding that calculation of a fine or fractional time difference, for example, a sub-sample time difference, in the time domain using an interpolation filter is difficult, as the type of interpolation filter directly influences the calculation of the fine delay. Embodiments of the present invention are based on the finding that on the other hand, the calculation of the complete time difference in the frequency range without delay correction and, in particular, without a coarse delay correction, may lead to strong phase jumps. By simultaneously using the time domain and the frequency domain, embodiments of the present invention may maximize the respective advantages (simple processing of the first or coarse time difference between the times of arrival of the two signal representations using correlation in the time domain; accurate determination of the second or fine time difference between the times of arrival of the two signal representations exploiting phase difference information, e.g. to determine the group delay of the phase difference component, between the frequency-domain representations of the signal) and minimize the respective disadvantages of the two domains (time domain and frequency domain) for determining the time difference.

Therefore, an embodiment of a method for determining a time difference between a first time of arrival of a signal and a second time of arrival of the signal comprises: receiving a first representation of the signal at the first time of arrival, receiving a second representation of the signal at the second time of arrival, correlating at least a first time-domain representation of the signal derived from the first representation of the signal and a second time-domain representation of the signal derived from the second representation of the signal to obtain a first time-domain information; evaluating a phase difference relation between at least a first frequency-domain representation of the signal derived from the first representation of the signal and a second frequency-domain representation of the signal derived from the second representation of the signal; and determining the time difference between the first time of arrival of the signal and the second time of arrival of the signal based on the first time difference information and the second time difference information, or based on a time difference information derived from the first time difference information and the second time difference information.

Such embodiments may, for example, comprise a local or central buffer for storing the first representation of the signal and the second representation of the signal so that both can be used for both, the time-domain signal processing (using time-domain representations of the signal) to obtain the first time difference information and for the frequency-domain signal processing (using frequency domain representations of the signal) to obtain the second time difference information. The local or central buffering of the representations of the signal even allows determining the time difference for short signals or small sets of signals.

Further embodiments may comprise no local or central buffers to store the first and second representation of the signal so that each representation of the signal can only be used once, for example, for a signal processing in the time-domain or for a signal processing in the frequency domain. Such embodiments may use besides the signal for which the time difference is to be determined, e.g. a first signal, one or more further signals, e.g. second, third, etc signal, transmitted, for example, from the same source or object and received by the same receiver or the same receivers so that the first and second representations of the further signals can be used for the time-domain processing, e.g. for the correlation to obtain the first time difference information, and the first and second representations of the first signal can be used for the frequency-domain processing, e.g. for evaluating the phase difference relation to obtain the second time difference information, or vice versa. In case the transmission and reception conditions for the signal and the further signals are equal or essentially equal, which is, for example, typically the case for consecutive signals transmitted with only a minor delay or in case the transmitter does not move, the first time difference information obtained by using the time difference representations of the further signal and the second time difference information obtained by evaluating a phase difference relation of the frequency domain representation of the first signal can be used to determine the time difference between the first time of arrival of the signal and the second time of arrival of the first signal and/or for determining the time difference between the third time of arrival at which a first representation of the further signal was received and the fourth time of arrival at which a second representation of the further signal was received.

Embodiments without local or central buffering the received representations of the signal or the further signals may reduce the costs incurred with providing local or central buffer and managing the buffered data and may also accelerate the processing, because no buffering of the data is performed in-between.

However, it should be mentioned that embodiments using different signals for the time-domain processing and the frequency-domain processing (for example, the first signal for the frequency-domain processing and the further or second signal for the time-domain processing or vice-versa) can also be used with embodiments having a local or central buffer.

Even further embodiments of the present invention may use a plurality of signals to obtain the first time difference information in the time-domain and the same or a different plurality of signals to obtain the second time difference information in the frequency domain.

Further embodiments may comprise shifting the first time-domain representation and/or the second time-domain representation of the signal based on or depending on the first time difference information such that a remaining time difference between the first time-domain representation and the second time-domain representation is reduced. This may, for example, be performed by shifting the first time-domain representation of the signal towards the second time-domain representation of the signal, by shifting the second time-domain signal towards the first time-domain signal, or by shifting the first time-domain signal towards the second time-domain representation of the signal and, at the same time, shifting the second time-domain representation towards the first time-domain representation. In case, for example, the first representation of the signal is received earlier than the second representation of the signal or, put different, the first time of arrival is earlier than the second time of arrival, the first time-domain representation may be delayed to reduce the remaining time difference between the delayed or shifted version of the first time-domain representation and the second time-domain representation of the signal. The smaller the remaining time difference between the first time-domain representation and the second time-domain representation of the signal, the smaller the disturbing impacts of the phase jumps caused by the ambiguity of the frequency domain representations are.

Preferably, the first time-domain representation is shifted by the first time difference information, for example, a coarse time difference obtained by a correlation of the first time-domain representation and the second time-domain representation of the signal without interleaving, so that only a fine time difference of less than 0.5 samples or of less than half of a sample period (+/−0.5 sample period) remains. Thus, only minor phase jump corrections, for example, for some frequency bins of the frequency-domain representation of the signals or the phase differences for the frequency bins obtained by subtracting the phase values of the respective frequency bins of the first and second frequency domain representations of the signal may be necessitated, if at all, to obtain an accurate second time difference information. In other words, the frequency-domain processing can be, e.g., used to only determine a fine or sub-sample time difference between the first time of arrival and the second time of arrival.

In further embodiments, the first time-domain representation of the signal used for the correlation is a first residual signal obtained by linear prediction encoding in the time domain a first sampled or digitized time-domain representation of the signal, and the second time-domain representation used for the correlation is a second residual obtained by linear predictive encoding a sampled or digitized time domain representation of the signal. By performing a linear prediction encoding of the time-domain signals prior to correlating the linear predictive encoded time-domain representations or signals, the results of the correlation can be improved, in particular, for signals with high carrier portions. Furthermore, a data reduction is achieved as only the residuals of the time-domain signals are further processed, transmitted or stored.

The sets of the linear prediction coefficients or parameters for the linear prediction encoding can be fixed, predetermined or determined based on known linear prediction encoding estimation algorithms and methods.

In even further embodiments, a reliability parameter $\alpha$ is calculated for a single correlation result or for a plurality of correlation results, for example, obtained for a plurality of consecutive signals or a plurality of signals within a predetermined time span (during which the distances between the transmitter and the receivers can be regarded as constant or changes in distances at least neglected), wherein each signal is received as a first and a second representation of a respective signal at respective first and second times of arrival, and wherein for each first and second representation of the signal, a first time difference information has been determined by the correlation of the two representations. The reliability parameter may, for example, be a mean value of the plurality of resulting individual reliability parameters or, advantageously, a reliability parameter obtained by evaluating the mean correlation result calculated based on the individual correlation results of the plurality of signal representation pairs of the individual signals.

Embodiments of the invention can be adapted to perform the frequency-domain processing to obtain a second time difference information in case this time-domain reliability parameter fulfils a certain condition, for example, exceeds a certain threshold or falls below a certain threshold. In other words, in case the time-domain reliability parameter does not fulfill the predetermined condition, e.g. because the first and second representations received at the first time of arrival and the second representation of the same signal received at the second time of arrival and the first and corresponding second representations of the further signals of the plurality of signals received at the respective first and second individual times of arrival do not match sufficiently, no frequency domain processing is performed to obtain the second or fine time difference.

Even other embodiments of the present invention time-to-frequency transform the first and the second time-domain representations, linear prediction encoded time-domain representations of the first and second signals and/or even further processed versions of the two (e.g. by quantization and/or entropy encoding) to obtain the first and second frequency domain representations, for example, FFT-representation (FFT—Fast Fourier Transformation).

Certain embodiments may use all frequency bins of the first frequency domain representation, for example, of the first FFT-representation, and all frequency bins of the second frequency domain representation, for example, the second FFT-representation, to calculate a phase difference between the two frequency-domain representations for each frequency bin, to evaluate the phase difference relation between the two frequency domain representations of the signal, and to finally obtain the second time difference information.

However, it has been found that the frequency domain representations of the signals often comprise at least several frequency bins, if not many, which contain only little or no energy, while only a certain subset of the frequency bins comprises energy with a considerable value. The frequency bins with low energy values are predominantly or at least to a large amount caused by noise and, therefore, do not comprise any useful information for obtaining, e.g., the second time difference information. On the contrary, such frequency bins with low energy values or magnitudes may even deteriorate the accuracy of the second time difference information. Therefore, other embodiments of the present invention comprise selecting a sub-set of the strongest frequency bins, absolute or relative, and determine the phase differences and the second time difference information only based on the phase values of the first and second frequency domain representation for these frequency bins and the phase difference values derived from thereof.

The second time difference information can, for example, be obtained by performing a statistical regression (e.g. a linear regression analysis) analysis or decomposition analysis (e.g. a QR decomposition, an RQ or an LQ decomposition, wherein Q is an orthogonal matrix, R is an upper or right triangular matrix and L is a left or lower triangular matrix). Based on these regression methods or decomposition methods, for example, a graph or straight line describing a linear statistical relationship between pairs of values of frequency bins and the phase differences associated to these frequency bins can be determined. The inclination of this graph or straight line represents a good estimate of the group delay and can be used to obtain the second time difference information or fine time difference information as the group delay is proportional to the second time difference information.

Embodiments may comprise using all or selected frequency bins, for example, the strongest frequency bins as described above, to determine the group delay and the corresponding second time difference information.

Even further embodiments may use the pairs of values of frequency bins and associated phase difference values for a large number of signals, to improve the reliability and accuracy of such regression or decomposition methods.

By nesting the time and frequency domains, e.g. by providing transitions back and forth between the time domain and the frequency domain, it is further possible to continuously localize moving objects without running the risk of the system becoming instable.

A further advantage of the system is the low costs compared to conventional direction-finding methods, for example, correlation interferometers. In addition, an already-existing network of at least three receivers may easily be provided with a direction finder without reconstruction.

Both the software of the center or central unit 1090 and the software of the individual remote stations 110 to 130 or receivers may easily be realized and necessitates comparatively few hardware resources.

Conventionally, a direction-finding value may quickly be calculated. By a weighting of the direction-finding values derived from the accuracy or reliability parameters, over time the direction-finding accuracy may be increased, i.e. the system is very scalable.

Embodiments of the present invention may perfectly be combined with other direction-finding methods to use the respective advantages from both methods. Further embodiments comprise a system and a method for position-finding the transmitter based on a time division of arrival algorithm using embodiments of the method and system for determining time differences of arrival for two or more receiver pairs.

Further embodiments of the invention provide a method for determining a time difference between a first time of arrival of a first signal and a second time of arrival of the first signal and/or determining a time difference between the third time of arrival of a second signal and a fourth time of arrival of the second signal, comprising: receiving a first representation of the first signal at the first time of arrival; receiving a second representation of the first signal at the second time of arrival; receiving a first representation of the second signal at the third time of arrival; receiving a second representation of the second signal at the fourth time of arrival; correlating at least a first time-domain representation of the second signal derived from the first representation of the second signal and a second time-domain representation of the second signal derived from the second representation of the second signal to obtain a first time difference information; evaluating a phase difference relation between a first frequency-domain representation of the first signal derived from the first representation of the first signal and a second frequency-domain representation of the first signal derived from the second representation of the first signal to obtain a second time information; and determining the time difference between the first time of arrival of the signal and the second time of arrival of the signal based on the first time difference information and the second time difference information and/or determining the time difference between the third time of arrival of the second signal and the fourth time of arrival of the second signal based on the first time difference information and the second time difference information.

Further embodiments provide a system for determining a time difference between a first time of arrival of a signal and a second time of arrival of a signal, comprising: a first receiver adapted to receive a first representation of the signal at the first time of arrival; a second receiver adapted to receive a second representation of the signal at the second time of arrival; and a central unit adapted to: correlate at least a first time-domain representation of the signal derived from the first representation of the signal and a second time-domain representation of the signal derived from the second representation of the signal to obtain a first time difference information; evaluate a phase difference relation between at least a first frequency-domain representation of the signal derived from the first representation of the signal and a second frequency-domain representation of the signal derived from the second representation of the signal; and determine the time difference between the first time of arrival of the signal and the second time of arrival of the signal based on the first time difference information and the second time difference information.

According to a further aspect of the invention, embodiments of the receivers or receiver stations of the system for determining a time difference of arrival of a signal (TDOA system) comprise a local storage means for storing the representation of the signal and the corresponding time of arrival so that this data or this representation can be used for the time domain processing and the frequency domain processing.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
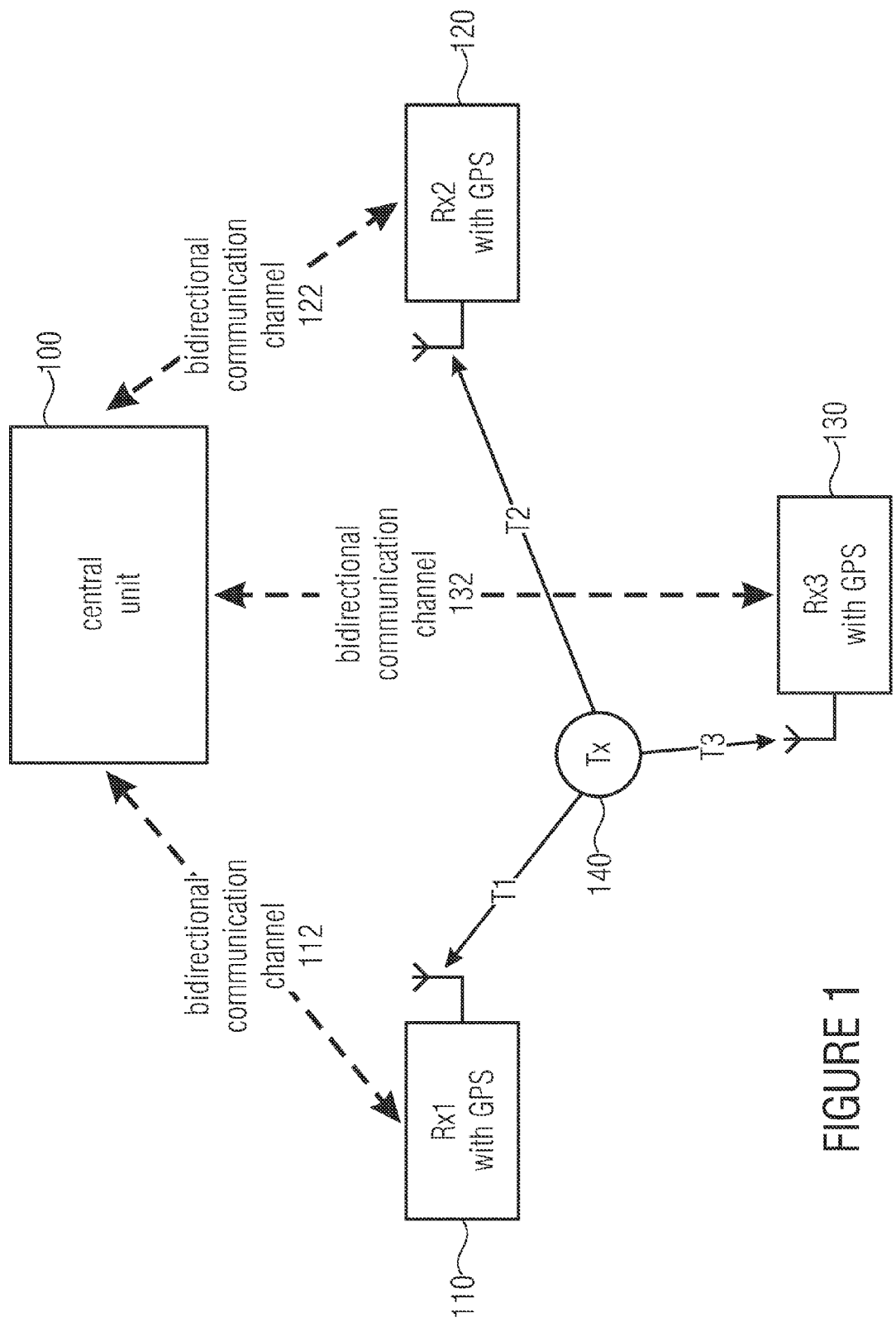
FIG. 1 shows a block diagram of an embodiment of a system for position-finding comprising three receivers and a central unit.

In the following, embodiments according to the present invention will be described with respect to FIGS. 1 to 12B. It should be noted that in the present description, objects, components and signals will be referenced with the same or similar reference signs when the respective elements are functionally or structurally comparable. Furthermore, objects, elements and signals referenced by the same or similar reference signs may, for instance, due to their comparable function or structure, be identical, having comparable or equal quantitive parameters. In other words, it is to be noted that the same or similarly acting functional elements have the same reference numerals in the different embodiments and, hence, the description of these functional elements is mutually interchangeable in the various embodiments illustrated in the following.

Moreover, in the following description, summarizing reference signs may be used to describe elements, objects or signals appearing more than once in an implementation or an embodiment when the respective part of the description applies to or at least a sub-set of the respective elements, objects or signals. If a property of such an element, object or signal, the feature or its integration into a system or apparatus is discussed, individual reference signs will be used to address the specific component.

FIG. 1 shows a block diagram of a distributed TDOA-based position-finding system comprising a central unit (CU) 100, a first receiver Rx1 110, a second receiver Rx2 120 and a third receiver Rx3 130. The central unit is connected to the first receiver Rx1 via a bidirectional communication channel 112, the second receiver Rx2 is connected to the central unit via a bidirectional communication channel 122 and the third receiver Rx3 is connected to the central unit via a bidirectional communication channel or link 132. The transmitter Tx 140 is the transmitter, emitter or, in general, object whose position shall be determined by the position-finding system based on signals, for example, transmission signals of any protocol, in particular, wireless protocols, generated and transmitted by the transmitter Tx.

Each receiver Rx1 to Rx3 is equipped with a GPS system for synchronizing the three receivers Rx1 to Rx3 so that they adhere to the same time scale and/or for determining the absolute position of each individual receiver Rx1 to Rx3 based on known GPS position-finding methods. Other embodiments may use other solutions to synchronize and/or determine the position of the receivers Rx1 to Rx3.

The bidirectional communication channels 112, 122 and 132 can, for example, be implemented as wired or wireline communication channels or links, for example, Ethernet wireless communication links, UMTS (Universal Mobile Telecommunication System), or implemented using any other conventional communication protocol. The propagation time or transmission time T1 of a signal transmitted from the transmitter Tx to the first receiver Rx1 is proportional to the distance D1 between the transmitter Tx and the first receiver Rx1. The same applies to the propagation or transmission time T2 and the distance D2 between the transmitter Tx and the second receiver Rx2 and the propagation or transmission time T3 and the distance D3 between the transmitter Tx and the third receiver Rx3. Therefore, if the transmitter Tx transmits a signal, this signal propagates, via the air interface, to the first receiver Rx1, the second receiver Rx2 and the third receiver Rx3. As the distance between the transmitter and each receiver and also the channel transfer function for the transmission between the transmitter and each receiver may be different, the same signal transmitted by the transmitter Tx is received at the first receiver Rx1 as a first representation of the signal at a first time of arrival, as second representation of the signal at the second receiver Rx2 at a second time of arrival and as a third representation of the signal at the third receiver Rx3 at a third time of arrival.

In contrast to TOA-based position-finding methods or systems, which necessitate, additional to the times of arrivals, the transmission time of the signal to calculate the propagation time and to determine, based on the propagation times, the position of a transmitter, TDOA-based systems do not necessitate any information about the time or point of time the signal was transmitted. Thus, the transmitter, for example, does not need to be synchronized with the receivers to determine the position of the transmitter. TDOA-based systems only determine the difference between the times of arrivals or, in other words, the difference between the propagation times T1 to T3.

The second receiver Rx2 is positioned at a location spatially separated and distinct from a position of the first receiver and the third receiver Rx3 is positioned at a location, which is spatially separated and distinct from the position of the first receiver or from the position of the second receiver.

As the propagation time is proportional to the distance between the transmitter and the individual receivers, also the time difference between the different times of arrival can be used in conjunction with the known positions by the individual receivers to determine, for each receiver pair, a hyperbola representing the possible locations of the transmitter according to the difference of time of arrival and the positions of the two receivers. Based on a minimum of two receiver pairs and their corresponding hyperbolas, the position of the transmitter can be determined by the intersection of these two hyperbolas. Therefore, TDOA-based systems necessitate at least three receivers to provide the at least two receiver pairs. However, having three receivers, already three receiver pairs are available and, thus, three time differences of arrival can be determined to calculate the position of the transmitter even more precisely. A further increase of accuracy can be achieved by adding further receivers and evaluating further differences of times of arrivals for the corresponding receiver pairs.

As can be seen from the discussion of FIG. 1, the accuracy of the determination of the difference of the time at which the first representation of the signal is received at the first receiver and of the second time of arrival at which the second representation of the signal is received at the second receiver Rx2 directly influences and also limits the accuracy of the position of the transmitter. Therefore, methods and systems allowing to efficiently and accurately determine the time difference between two times of arrivals of the signal allow to improve the position finding of the transmitter.

In the following, embodiments of the method for determining the time difference will be described, assuming that the first representation of the signal is received at the first receiver Rx1 and the second representation of the signal is received at the second receiver. However, it should be noted that the first representation of the signal may also be received at the second or third receiver and the second representation of the signal at any of the other two receivers or at any further receivers that may be part of the position finding system.

Figure 2:
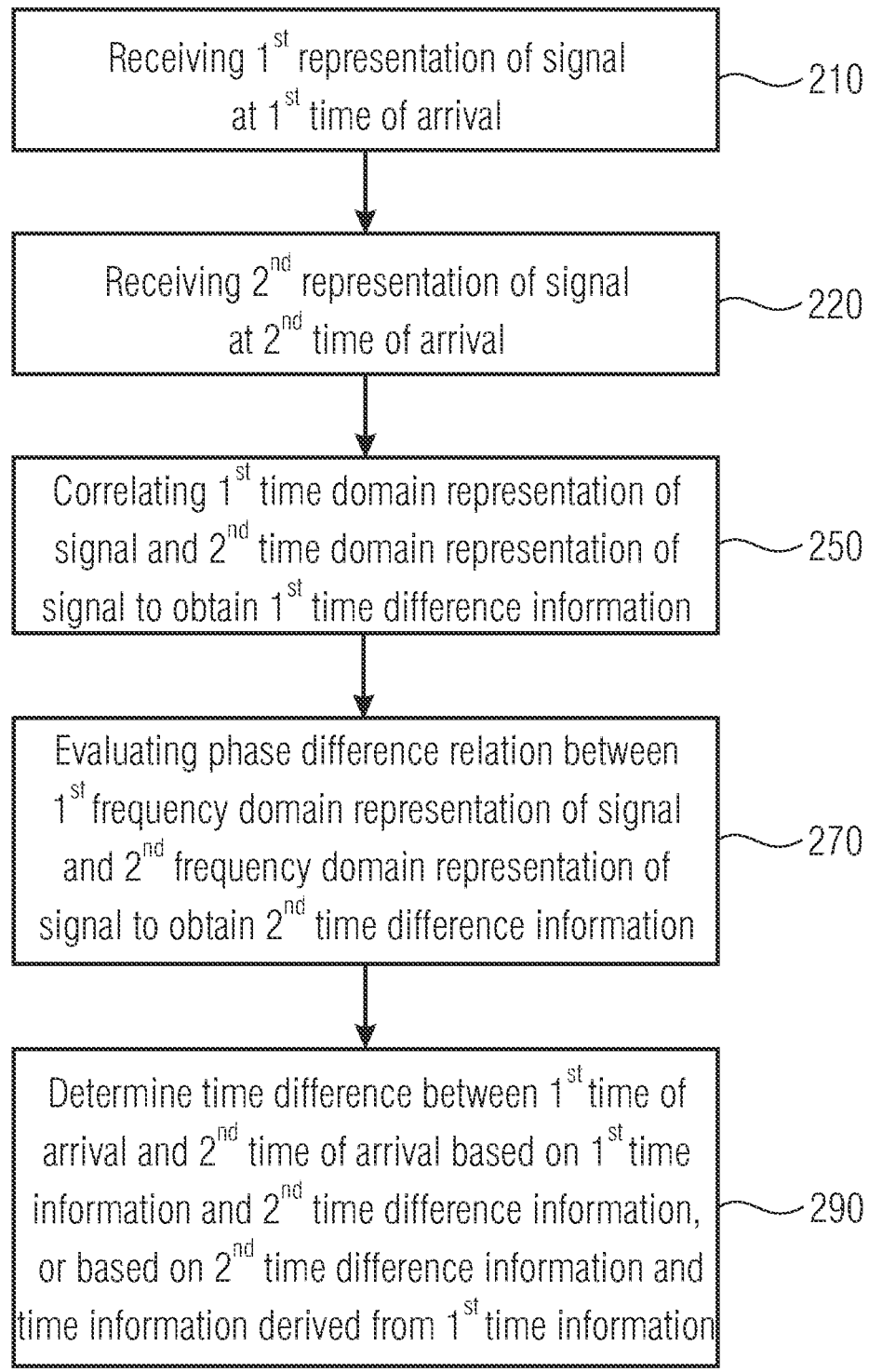
FIG. 2 shows a flow chart of a method for determining a time difference.

FIG. 2 shows a flow chart of an embodiment of a method for determining a time difference between a first time of arrival of the signal and a second time of arrival of the signal. The signal may, for example, be transmitted by the transmitter Tx. The method comprises receiving 210 a first representation of the signal at the first time of arrival. The method further comprises receiving a second representation of the same signal at the second time of arrival. The first representation of the signal may be received at the first time of arrival at the first receiver Rx1 and the second representation of the signal may be received at the second receiver Rx2 at the second time of arrival. However, the first representation of the signal may also be received at the second or third receiver at the first time of arrival and the second representation of the signal may be received by another receiver, for example, the first or third receiver.

The receivers, for example, the first, second and third receivers, will analog-to-digital convert the received signal to obtain a digital representation of the signal, typically a digital time-domain representation of the signal defined by consecutive values, for example, complex values. A received signal, for example, may be analog-to-digital converted or sampled at a predetermined sampling rate and with a corresponding sampling period, wherein the smaller the sampling period, the higher the temporal resolution of the received signal. In other words, step 210 may comprise sampling the first representation of the signal to obtain a first digital representation of the signal, for example, a first digital time-domain representation of the signal. Accordingly, the step 220 may comprise sampling the second representation of the signal at the same sampling rate or at least at the essentially same sampling rate to obtain a second digital representation of the signal, for example, a second digital time-domain representation of the signal.

The sampled or digitized data may be organized in frames comprising a predetermined number of samples or sample values, wherein each frame is associated to a time stamp describing the point in time the frame was received. The point of time a specific sample of the frame was received can be derived from the index of the sample within the frame and the time stamp associated to the frame.

In step 250, the first time-domain representation of the signal derived from the first representation of the signal and the second time-domain representation of the signal derived from the second representation of the signal are correlated to obtain a first time-domain information. The first time-domain representation may be the digital time-domain representation as described above or any further processed version thereof, as will be explained later in more detail. The same applies to the second time-domain representation of the signal.

As the first receiver and the second receiver are synchronized, the time of arrival of the first representation of the signal and the second representation of the signal references to the same time scale, for example, the time stamps associated to the frames referenced to the same absolute timing, for example, the GPS timing. In case the first time-domain representation of the signal and the second time-domain representation of the signal show high similarities, in other words, a high correlation, the correlation result shows a strong correlation peak at the respective time index (see latter FIG. 11). In other words, the correlation provides a first time difference information at the granularity of the sampling period in integer multiples of the sampling period and the corresponding sign indicating which of the two representations has been received later.

In step 270, a phase difference relation between a first frequency domain representation of the signal derived from the first representation of the signal and a second frequency domain representation of the signal derived from the second representation of the signal is evaluated to obtain the second time difference information. The first frequency domain representation may, for example, be obtained by time-to-frequency transforming the first time domain representation of the signal by, for example, a Fourier transformation, and the second frequency domain representation may be obtained by time-to-frequency transforming the second time-domain representation of the signal, for example, by the same Fourier transformation as used for the first representation of the signal. Typically, the same time-to-frequency transformation will be used for obtaining the first and the second frequency domain representation to obtain comparable results. In certain embodiments, the first frequency domain representation may be a digital frequency domain representation obtained by a Fast Fourier Transformation (FFT) of the first digital time domain signal. In further embodiments, the frequency domain representation may be obtained by Fast Fourier transforming a further processed version of the digital time-domain representation of the signal. The corresponding applies to the second frequency domain representation.

In step 290, the time difference between the first time of arrival of the signal and the second time of arrival of the signal is determined based on the first time difference information and the second time difference information.

The second time difference determined based on evaluating the phase difference relation may produce second time difference information with values larger than a sample rate or may provide second time difference information with values smaller than half a sample rate, i.e. providing a sub-sample time resolution.

As mentioned before, embodiments according to FIG. 2 allow combining the advantages of the frequency domain and the time-domain processing.

Figure 3:
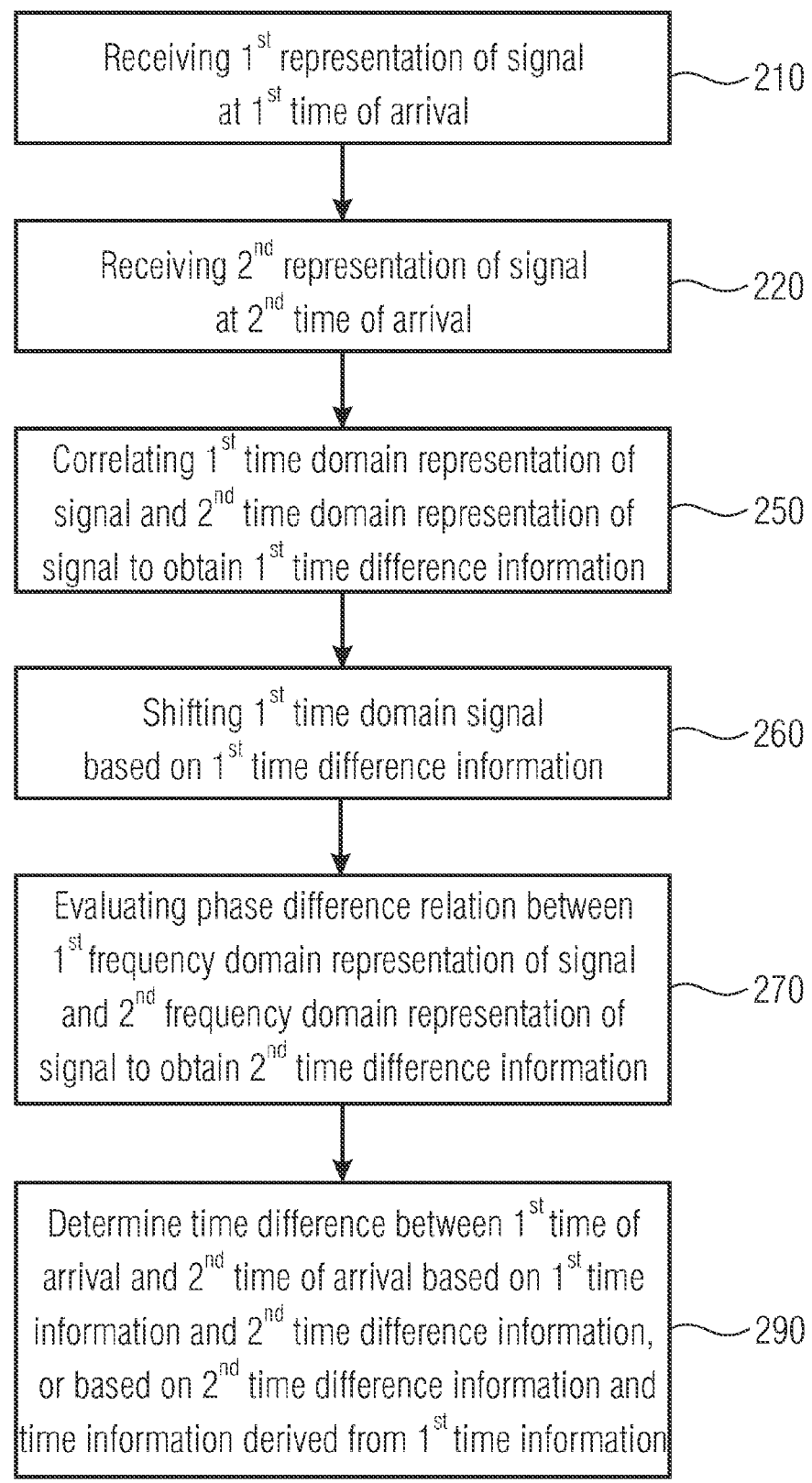
FIG. 3 shows a flow chart of a method for determining a time difference according to FIG. 2, additionally comprising shifting the first time-domain representation of the signal.

FIG. 3 shows a flow chart of an embodiment according to FIG. 2, which comprises an additional step 260. Step 260 comprises shifting the first time-domain signal by the first time difference information, such that a remaining time difference between the shifted first time-domain signal and the original second time-domain signal is reduced. The first time difference information obtained in step 250, which can also be referred to as coarse time difference or sample-level time difference is used to eliminate or at least reduce the ambiguities and phase jumps otherwise present in the frequency-domain in case of larger time differences, i.e. time differences larger than one sample period. In embodiments according to FIG. 3, the first frequency-domain representation is derived from the first representation by first shifting the first time-domain signal representation by the first time difference information and afterwards, time-to-frequency converting the time shifted version of the time-domain representation of the signal. In other words, in step 270 only the remaining fine or sub-sample time difference has to be determined based on evaluating the phase difference relation, which facilitates the signal processing in the frequency domain.

In step 290, the time difference between the first time of arrival of the signal and the second time of arrival of the signal is determined based on the first or coarse time difference information and the second or fine time difference information. In embodiments as described above, in step 290, the time difference can be determined by simply adding the first or coarse time difference information and the second or fine time difference information.

In alternative embodiments, step 260 may comprise shifting the second time-domain signal by the first time difference information such that the remaining time difference between the first time-domain signal and the shifted version of the second time-domain representation is reduced. Correspondingly, the second frequency domain representation of the signal is obtained by time-to-frequency-transforming the shifted version of the second time domain representation of the signal.

In an even further embodiment, both the first time domain representation of the signal and the second time domain representation of the signal are shifted such that a total shift of both is equal to the first time difference information. In this case, the first frequency domain representation of the signal is derived from the time shifted version of the first time domain representation and the second frequency domain representation of the signal is derived from the second time domain representation of the signal.

As mentioned before, other embodiments may comprise shifting the first time domain signal or a second time domain signal only partly, i.e., not to the full extent of the first time difference information as described above. Thus, the impact of the phase jumps is at least reduced compared to pure frequency domain processing without shifting at least one of the time domain representations.

Further embodiments according to FIG. 3 comprise a method for determining a time difference between a first time of arrival and a second time of arrival of a signal, wherein the method comprises the following steps. Receiving 210 the signal as first representation of the signal at a first receiver at the first time of arrival. Receiving 220 the signal as second representation of the signal at a second receiver at the second time of arrival, wherein the first receiver and the second receiver are positioned at different locations. Obtaining 250 a first or coarse time difference information (between the first time of arrival and the second time of arrival) based on a correlation of a first time domain representation of the signal representing or derived from the first representation and a second time domain representation representing or derived from the second representation. Shifting 260 in time at least one of the first time domain signal and the second time domain signal based on the coarse time difference such that a remaining second fine time difference is reduced, e.g. is smaller than the determined coarse time difference. Obtaining 270 a second or fine time difference information based on evaluating a phase difference relation between a first frequency domain signal derived from the first time domain signal or a shifted version thereof (using a time-frequency transformation) and on a second frequency-domain signal derived from the second time domain signal or a shifted version thereof using a time frequency transformation. Determining 290 the time difference between the first time of arrival and the second time of arrival of the signal based on a time shift by which the first and/or second time domain signal has been shifted and the fine difference. In case the first or second time domain representation has been shifted by the first time difference information, this corresponds to determining the time difference based on the first and second time difference information. In case the first or second time domain representation has been shifted less than the first time difference information, the coarse time difference is only partly eliminated, and the second time difference is larger than half a sample period. In this case, the ambiguity of the phase values of frequency-bins (caused by the 2π-periodicity of the phases of the frequency domain presentation, e.g. FFT presentations) and the corresponding phase jumps need to be considered when determining the second time difference information, e.g. by counting the number of phase jumps. Thus, the time difference can be determined by adding the applied time shift and the second time information.

In other word, depending on the extent of the shift (to the full or only partial extent of the first time information), embodiments may comprise determining the time difference between the first time of arrival and the second time of arrival of the signal by adding the first time difference information and the second time difference (e.g. for full shift) or a by adding a time difference information (e.g. the actual shift of the first and/or second time domain signal) derived from the first time information and the second time difference information.

Figure 4:
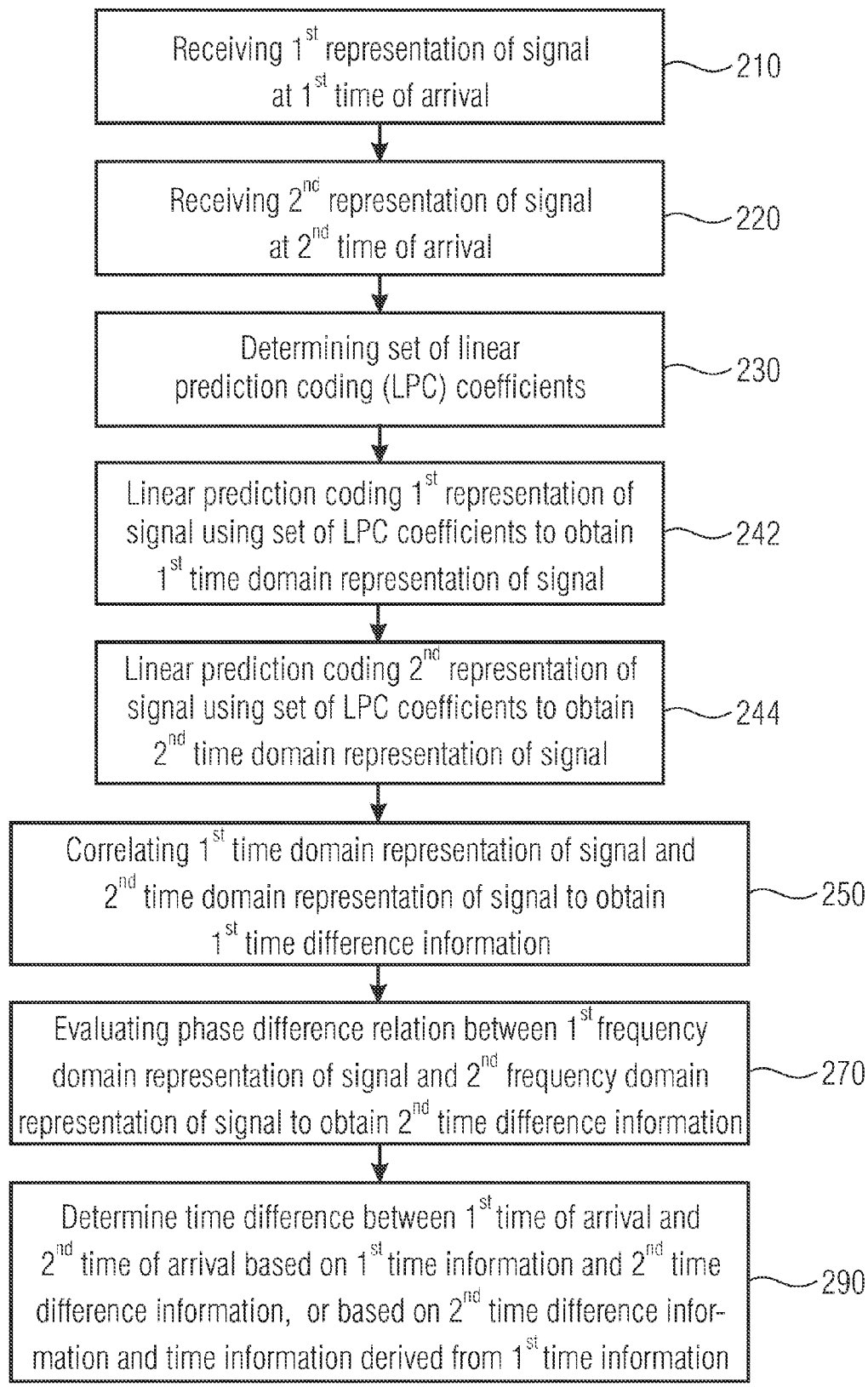
FIG. 4 shows a flow chart of an embodiment of a method for determining a time difference according to FIG. 2, additionally comprising linear prediction encoding the first representation and the second representation of the signal.

FIG. 4 shows a flow chart of an embodiment according to FIG. 2 comprising additionally a linear prediction encoding of the first and second representation of the signal. In step 230 a set of linear prediction coefficients is determined based on the first representation of the signal or the second representation of the signal. In step 242, this set of linear prediction coding coefficients is applied to the first representation to obtain the first time domain representation (or first residual representation or first time domain residual representation of the signal) and in step 244, the same set of linear prediction coding coefficients is also applied to the second representation to obtain the second time domain representation of the signal (or second residual representation signal or second time domain residual representation of the signal). The linear prediction coding is typically applied to a time domain representation, for example a sampled version of the first and second representation of the signal. In step 250, the first and second time domain representation of the signal, or in other words, the first linear prediction encoded time domain representation of the signal and the second linear prediction encoded time domain representation of the signal are correlated to obtain the first time difference information. According to one embodiment, the first non-linear prediction encoded time domain representation of the signal (e.g. the aforementioned first sampled version of the first representation of the signal) is time-to-frequency transformed to obtain the first frequency domain representation of the signal, and the second non-linear prediction encoded time domain representation (e.g. the aforementioned second sampled version of the second representation of the signal) is time-to-frequency transformed to obtain the second frequency domain representation, which are used to determine the second time difference information. In an alternative embodiment the first linear prediction encoded time domain representation of the signal is time-to-frequency transformed to obtain the first frequency domain representation of the signal, and the second linear prediction encoded time domain representation is time-to-frequency transformed to obtain the second frequency domain representation, which are used to determine the second time difference information.

Linear prediction coding or linear predictive coding (LPC) is a known algorithm or signal processing, where future samples of a discrete time signal are estimated as a linear function of previous samples. For example, a fixed number of previous samples is each weighted with a parameter. By adding the previous parameters weighted by the individual parameters an estimation value can be calculated for the actual respectively future sample. The better the linear prediction coding parameters or coefficients are, the smaller the difference value between the actual sample value and the estimated value calculated based on the linear prediction coding. The difference is also referred to as residual. The goal of linear prediction coding is to provide linear prediction coding parameters, which minimize the difference or residual values. Therefore, typical solutions for estimating the linear prediction parameters comprise using the root mean square criterion for minimizing the expected value of the squared error or residual between the actual sample values and the predicted sample values. Prediction coding allows to reduce the amount of data to be transmitted, as only the residual values and not the actual values are transmitted, while maintaining a high quality of the signal (lossless).

Furthermore, quantization as lossy data reduction and entropy coding can be used to reduce the amount of data, e.g. to be stored or transmitted between the receiver and the central unit or any other unit. In this case the quantized and/or entropy encoded time domain representations are, e.g., time-to-frequency-converted to obtain the frequency-domain representations of the signal.

In further embodiments, the optional step 230 comprises determining a first set of linear prediction encoding coefficients based on the first representation, for example a digital time domain representation of the first representation, and determining a corresponding signal-to-noise ratio (SNR) for the first residual representation obtained by linear prediction coding the first representation using the first set of linear prediction coding coefficients; and determining a second set of linear prediction coding coefficients based on the second representation of the signal, for example a digital time domain representation and determining a corresponding signal-to-noise ratio for the second residual representation obtained by linear prediction coding the second representation using the second set of linear prediction coding coefficients. The higher the SNR value the better the prediction coding. Therefore, in addition, step 230 comprises comparing the signal-to-noise ratio for or associated to the first residual representation and the signal-to-noise ratio for or associated to the second residual representation and selecting the first set of linear prediction coding coefficients in case the signal-to-noise ratio of associated to the first residual representation is higher than the signal-to-noise ratio associated to the second residual representation, for linear prediction coding the first representation and the second representation. In case the signal-to-noise ratio associated to the second residual representation is higher than the signal-to-noise ratio of associated to the first residual signal, a linear prediction coding of steps 242 and 244 is performed using the second set of linear prediction coding coefficients.

Figure 5:
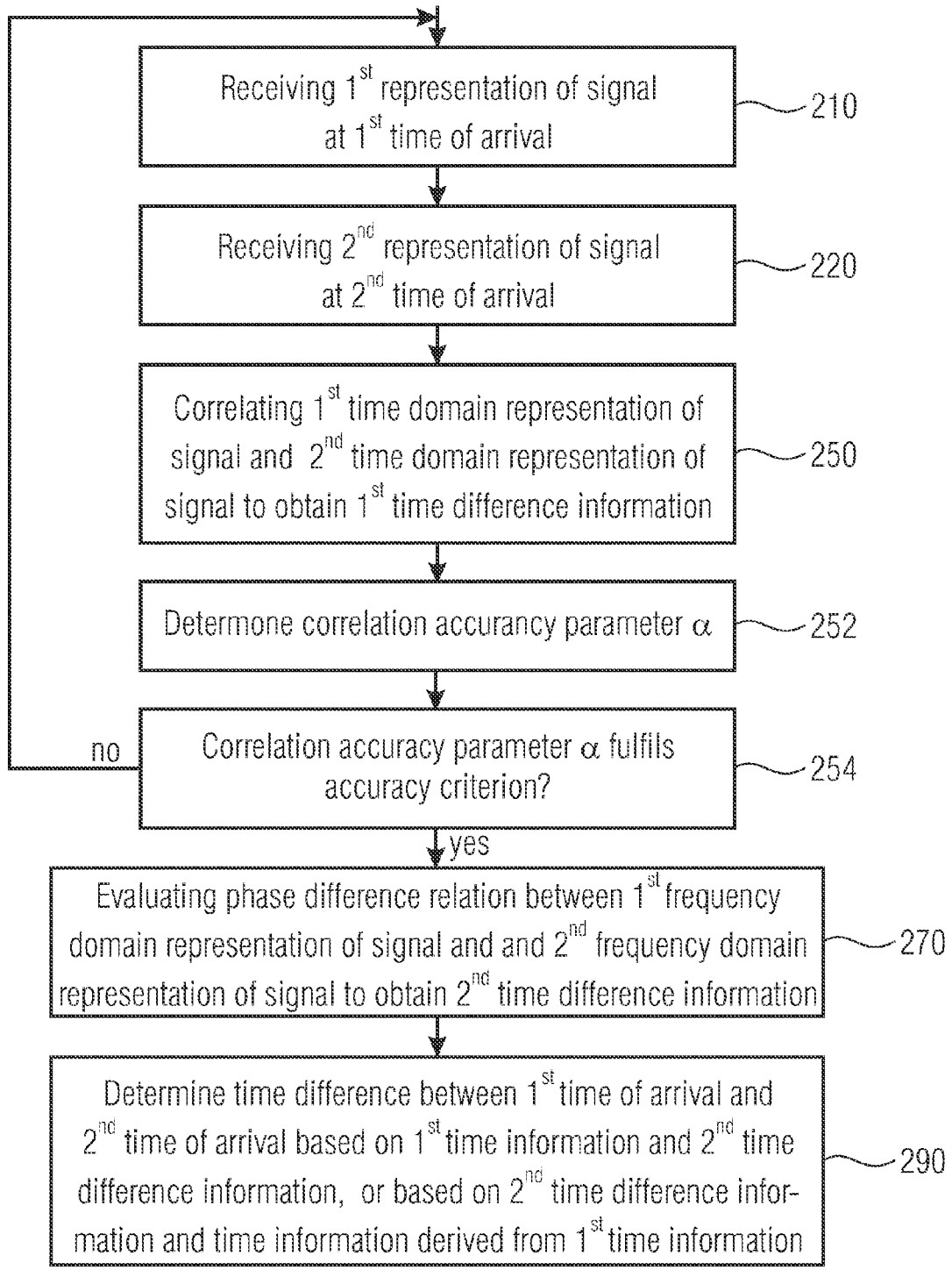
FIG. 5 shows a flow chart of an embodiment of the method for determining a time difference according to FIG. 2, additionally comprising determining a accuracy measure for the correlation.

FIG. 5 shows a flow chart of an embodiment according to FIG. 2 additionally comprising the determination of a reliability or accuracy parameter. With reference to FIG. 5, after the correlation in step 250 has been performed, the accuracy or reliability of the correlation result, for example the first time difference information, is evaluated. As mentioned previously, the higher the similarity between the first representation and the second representation, the higher and steeper the correlation peak. The accuracy or reliability measure a can be calculated (step 252 in FIG. 5), for example, by determining the absolute difference (see dp in FIG. 11C) between the highest correlation peak (see peak P1 in FIG. 11C) and the next highest correlation peak (see peak P2 in FIG. 11c) or determining a ratio between the highest correlation peak P1 and the next highest correlation peak P2. Other methods comprise matching the peak shape to a mask. Furthermore, in step 254, this accuracy parameter is evaluated according to an accuracy condition, wherein, for example, only in case the accuracy condition is fulfilled (yes), the method continues with step 270, i.e., determining the second time difference information. In case the accuracy parameter does not fulfill the accuracy condition (no), the correlation or first time difference information is considered to be not sufficiently accurate and, therefore, the method performs, e.g., steps 210 to 254 for a next or consecutive signal in the same manner as for the actual signal. Step 254 may comprise comparing the accuracy parameter with a threshold and may be implemented to proceed to the frequency domain processing in case the accuracy parameter is smaller than the predetermined threshold and can be implemented to proceed with a next signal in the time domain processing in case the accuracy parameter is not smaller than the threshold.

In even further embodiments, the method according to FIG. 5 may be implemented to calculate the accuracy parameter based on a variable or fixed predetermined number of correlation results or first time difference information. For example, the method can be implemented to calculate the mean value of the plurality of correlation results (for example the mean value of the magnitudes of the correlation results for 100 frames) and to calculate the accuracy parameter for the mean or average correlation result. The method continues with step 270 in case the mean or average accuracy parameter fulfills the accuracy criterion.

Figure 6:
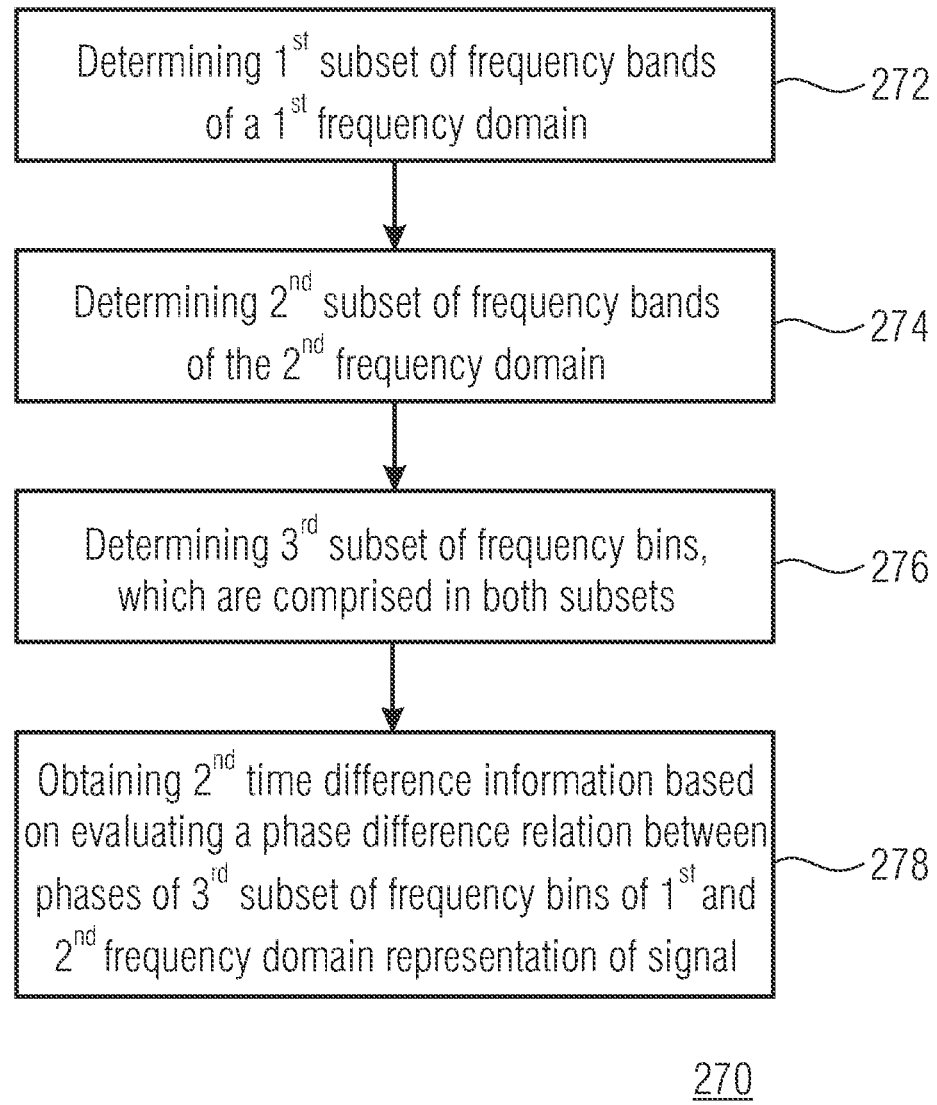
FIG. 6 shows a flow chart of an embodiment for determining a time difference according to FIG. 2, additionally comprising a frequency bin selection in the frequency domain.

FIG. 6 shows a flow chart of a specific embodiment of step 270 according to FIGS. 2 to 6, comprising sub-steps 272 to 278.

In step 272 a first subset of frequency bins of a first frequency domain representation is determined based on magnitudes, or energy values, or another criterion or a mixture of different criteria associated to the frequency bins of the first frequency-domain representation of the signal, For example, instead of using the magnitudes or energy values directly, the magnitudes or energy values may be weighted by their frequency or frequency bins and the weighted magnitudes or energy values are used to determine the first subset of frequency bins.

In step 274 a second subset of frequency bands of the second frequency domain representation is determined based on magnitudes, or energy values, or another criterion or a mixture of different criteria associated to the frequency bands of the second frequency domain representation.

Afterwards, in step 276 the first subset of frequency bins and the second subset of frequency bins are compared and only the frequency bins which are comprised in both subsets are selected for a third common subset frequency bins. Or in other words, a third subset of frequency bins comprising only the frequency bins, which are comprised in the first and second subset of frequency bins, i.e. the intersection bins, is defined.

Having defined the third subset and its corresponding frequency bins, in step 278 the fine or second time difference information is determined based on evaluating a phase difference relation between corresponding pairs of frequency bins of the third subset of frequency bins of the first frequency domain representation of the signal and of the second frequency domain representation of the signal.

The steps 272 and 274 may, for example, be performed by comparing the magnitudes, or energy values, or another criterion or a mixture of different criteria of the frequency bands of the first frequency domain representation and by selecting a predetermined number of frequency bands with the largest magnitudes for the first subset of frequency bands. The corresponding applies to the second frequency domain representation and the second subset of frequency bands, i.e., step 274 comprises, for example, comparing the magnitudes or energy values of the frequency bands of the second frequency domain representation and selecting a predetermined number of frequency bands with the largest magnitudes for the second subset of frequency bands.

An alternative embodiment of step 272 may, for example, comprise comparing a magnitude associated to a frequency band of the first frequency domain representation and assigning the frequency band to the first subset of frequency bands in case the magnitude is greater than a predetermined magnitude threshold. The same applies in a corresponding manner for step 274 for determining the second subset based on the frequency bands of the second frequency domain representation.

Figure 7:
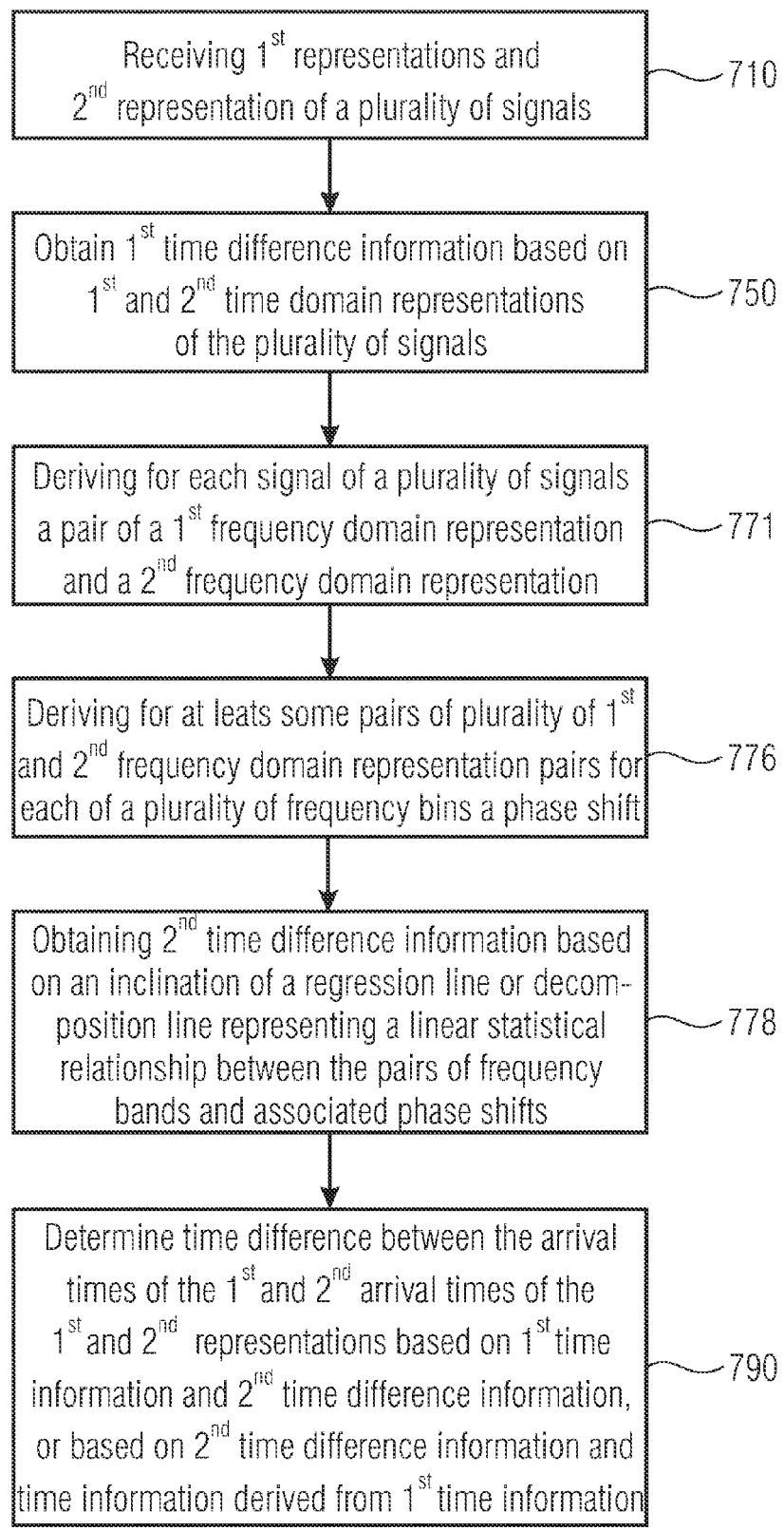
FIG. 7 shows a flow chart of an embodiment of the method for determining a time difference according to FIG. 2, additionally comprising determining the second time difference information based on determining the inclination of a regression line or decomposition line calculated for pairs of values comprising a phase difference between the phase of a first frequency-domain representation and the phase value of a second frequency-domain representation of the signal and the corresponding frequency bin.

FIG. 7 shows a flow chart of an embodiment of the method for determining a time difference between a first time of arrival and a second time of arrival, wherein the time difference is determined based on a plurality of signals (frames). The method comprises the following steps.

Deriving 710 for each signal of the plurality of signals a pair of a first frequency domain signal and a second frequency domain signal.

Obtaining 750 a first time difference information by correlating the first and second representation of each signal individually and, optionally, calculating an average correlation result.

Deriving 771 for each signal of the plurality of signals a pair of a 1st frequency domain representation and a 2nd frequency domain representation.

Deriving 776 for at least some pairs of a plurality of first and second frequency domain representation pairs for each of a plurality of frequency bins a phase shift associated to the corresponding frequency bin.

Obtaining 778 a second time difference information based on an inclination of a regression line or decomposition line (see L1 in FIGS. 11H and 11I) representing a linear statistical relationship between the pairs of frequency bands and associated phase shifts. Other embodiments comprise more general, obtaining the second time difference information by evaluating a statistical relationship between the pairs of frequency bands and associated phase shifts.

Further embodiments may comprise, before determining the statistical relationship, e.g. before performing the regression analysis or the decomposition, performing a phase offset-correction by subtracting a bias or offset (see B in FIG. 11H) of a regression line (see L2 in FIG. 11H before offset or bias correction) with regard to the zero-phase line at the zero frequency bin to obtain phase jump corrected versions of the pairs of frequency bins and associated phase differences (see grey cloud of value pairs prior to offset correction, reference sign 1110, and black cloud of value pairs after offset correction, reference sign 1120).

Figure 8:
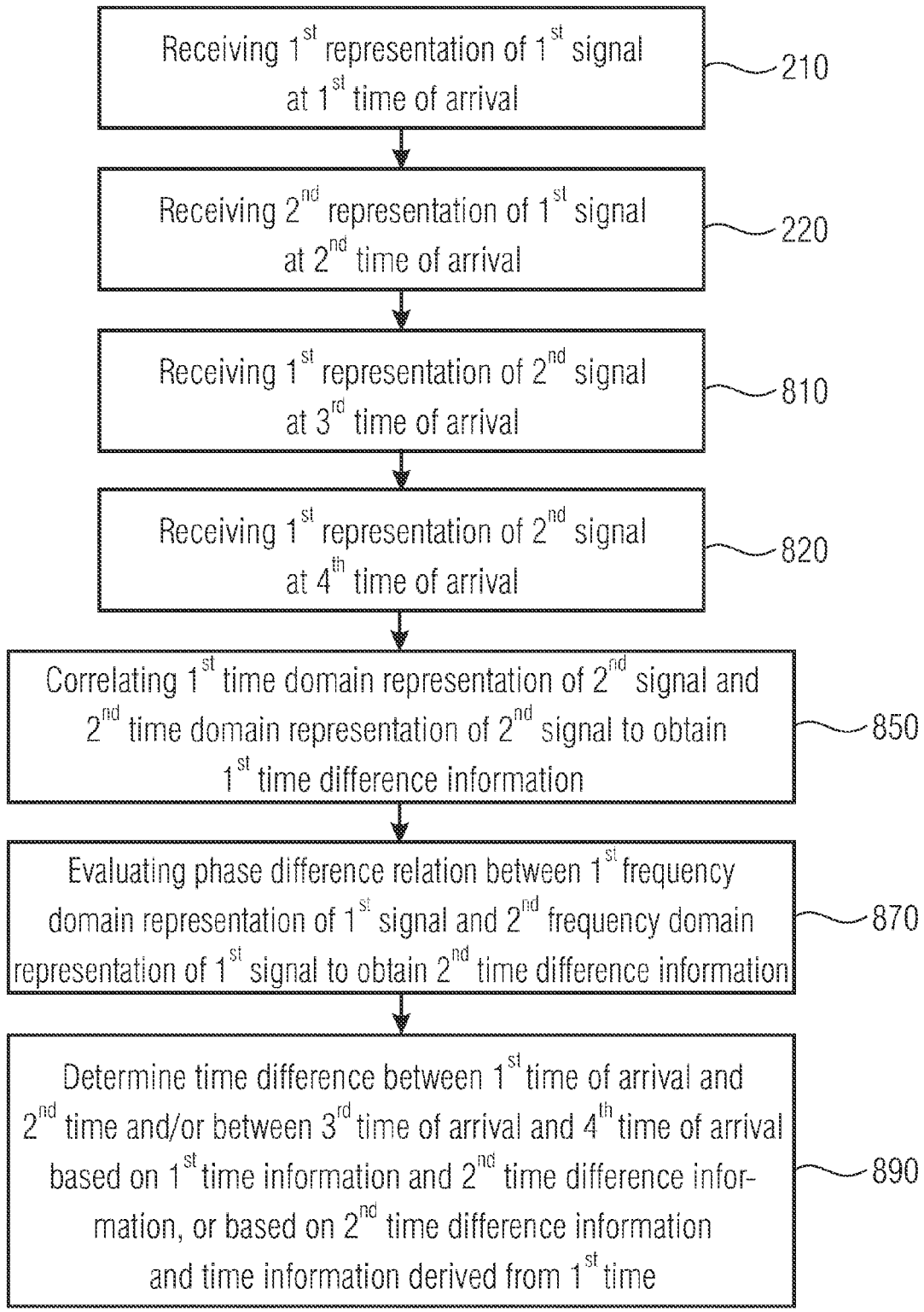
FIG. 8 shows a flow chart of an embodiment of the invention for determining a time difference based on at least two signals, which can be used for systems without signal or frame buffering.

FIG. 8 shows an embodiment of a method for determining a time difference between a first time of arrival of a first signal and a second time of arrival of the first signal and/or determining a time difference between the third time of arrival of a second signal and a fourth time of arrival of the second signal.

At first the representation of the signal are received: e.g. receiving 210 a first representation of the first signal at the first time of arrival; receiving 220 a second representation of the first signal at the second time of arrival; receiving 810 a first representation of the second signal at the third time of arrival; and receiving 820 a second representation of the second signal at the fourth time of arrival.

In step 850 at least a first time-domain representation of the second signal derived from the first representation of the second signal and a second time-domain representation of the second signal derived from the second representation of the second signal are correlated to obtain a first time difference information.

Afterwards or in parallel in step 870 a phase difference relation between a first frequency-domain representation of the first signal derived from the first representation of the first signal and a second frequency-domain representation of the first signal derived from the second representation of the first signal is evaluated to obtain a second time information.

Finally, in step 890 the time difference between the first time of arrival of the signal and the second time of arrival of the signal is determined based on the first time difference information and the second time difference information and/or determining the time difference between the third time of arrival of the second signal and the fourth time of arrival of the second signal based on the first time difference information and the second time difference information.

As mentioned before, embodiments according to FIG. 8 can be used, when no local buffer is available which would allow to use the representations of the received signals for both, time domain and frequency domain processing. However, such embodiments may also be used in case a cache is available. The comments with regard to FIGS. 2 to 7 apply correspondingly to embodiments according to FIG. 8. In other words, full or partial shifting of the time domain signals, accuracy parameters for individual or a plurality of signals and their respective correlation results, linear prediction coding, frequency bin selection, phase offset correction and/or regression analysis or decomposition may be applied to the representations of the signals, wherein only one signal or a plurality of signals can be used for the time and the frequency domain processing.

In the following, a further embodiment of the method and system for determining a time difference between a first time of arrival and a second time of arrival of a signal will be described with reference to FIGS. 1 and 9 to 11A to 11J.

Figure 9:
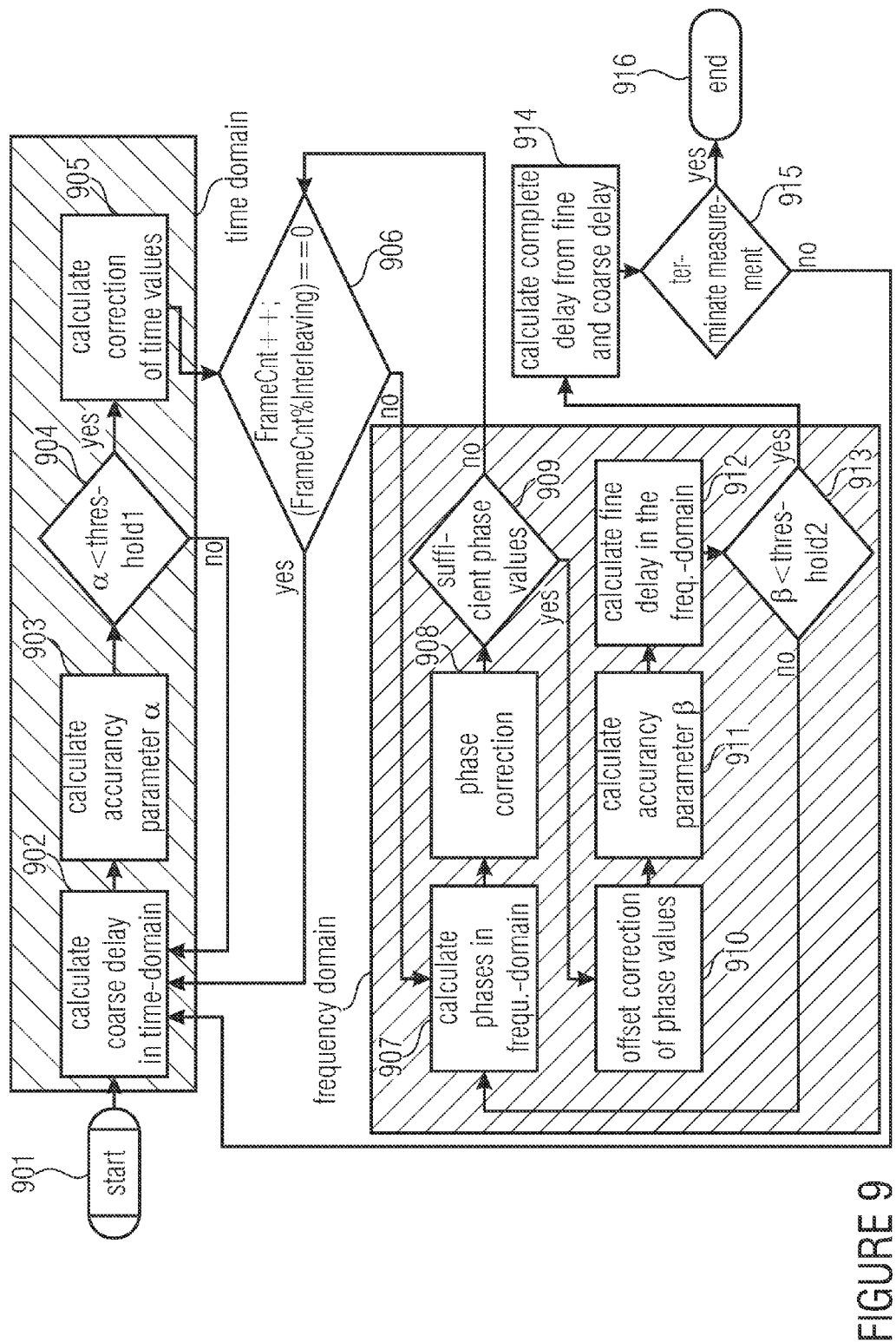
FIG. 9 shows a flow chart of an embodiment of a method for determining a time difference without frame buffering.
Figure 10:
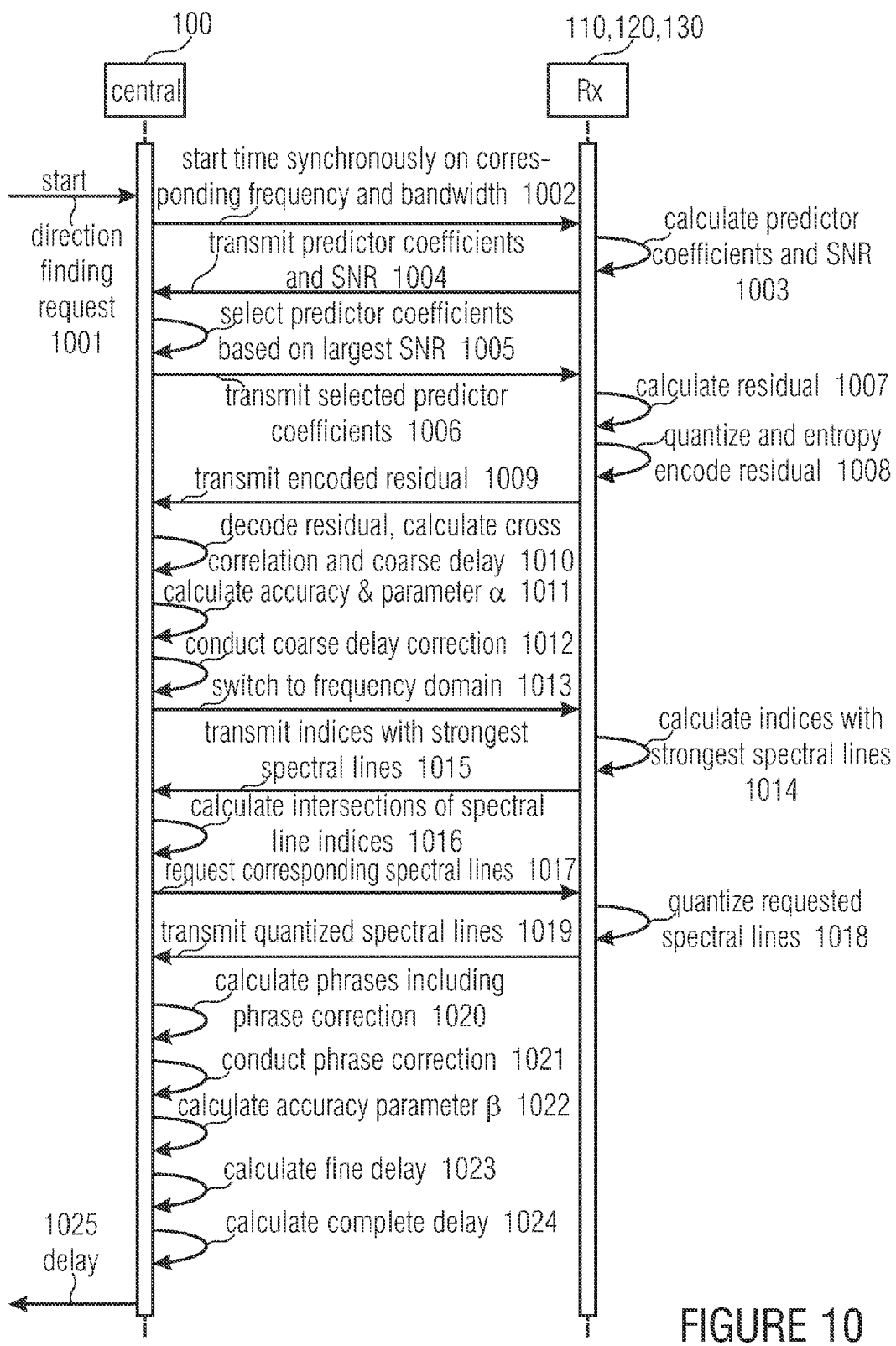
FIG. 10 shows a time diagram of a communication between the central unit and the receivers for a TDOA system according to FIG. 1 performing, for each receiver pair, an embodiment of the method for determining the time difference according to FIG. 8.

The particular embodiment described based on FIGS. 9 to 11 comprises, for example, no local or central storage means for storing the signals received at the first receiver Rx1 and the second Rx2 (see FIG. 1) so that each signal or frame can be only be used for either the time domain processing (e.g. steps 220 to 255 or the frequency domain processing steps 260 and 270, or see FIG. 8).

As mentioned before, embodiments of the invention, in contrast to conventional technology, not only use a method for calculating the temporal overall distortion (see BRIGHAM, Elbert Oran: FFT-Anwendungen, Oldenburg, 1997, in the following referred to as [1]), but a nested or interleaved mechanism, wherein one portion operates in the time domain and a further portion operates in the frequency domain.

FIG. 9 shows a flow chart of a method performed by each receiver pair Rx1 and Rx2, Rx1 and Rx3, or Rx2 and Rx3.

In the beginning, the direction finding request is defined for a certain frequency and with a certain band width. All participating receivers, for example, Rx1 to Rx3, then accordingly start time-synchronously the process (see step 901 "start").

In step 902 ("calculate coarse delay in time-domain") the coarse delay is calculated on a sample basis by means of a residual signal formation via a predictor, for example, linear prediction coding and a cross correlation (see also FIG. 4). In other words, as previously explained, the signal transmitted by the transmitter Tx is received, for example at the first receiver Rx1 as a first representation of the signal and at the second receiver Rx2 as a second representation of the signal. Typically, the first and second representation are analogue to digital converted and sampled to obtain the first and second time domain representation of the signal. As also described, the first and second time domain representations of the signal are linear prediction coded to obtain a first residual representation and a second residual representation of the signal (time domain residual representation). The first time domain residual representation and the second time domain residual representation of the signal are correlated to determine the coarse delay or first time difference information. The coarse delay has a sample resolution.

In step 903 ("calculate accuracy parameter α"), the result of the correlation or cross-correlation computation is used to determine an accuracy parameter α, which describes the ratio of the maximum value of the cross-correlation to the environment (see also FIG. 5)

In step 904 the accuracy parameter alpha is compared to a threshold, for example a first threshold "threshold 1" ("α<threshold 1"). If the accuracy parameter α is smaller than a predetermined threshold 1, the calculation of the coarse delay is classified as meaningful, see "yes". If the accuracy parameter α is not smaller than threshold 1, the process returns to step 902 to calculate further coarse delays in the time domain, see "no" (see also FIG. 5).

According to one embodiment, the calculation of the coarse delay in the time domain (step 902) is performed on a signal per signal or frame by frame basis, whereas the calculation of the accuracy parameters (see step 903) is performed by determining an average of a predetermined number of the absolute values of the correlation results. In a specific embodiment, an average of the absolute correlation results for 100 frames is used to determine the accuracy parameter α. Further embodiments may comprise different methods for calculating the accuracy parameter for a single or for a plurality of signals or frames.

In step 905 ("coarse delay correction of time values"), based on the calculated coarse delay or coarse time difference, a corresponding coarse delay correction (see also FIG. 3) is executed at one of the two involved time signals or representations of the signal. In embodiments, one of the two involved representations of the signal is shifted by the full coarse delay. However, alternative embodiments, as previously described, may also comprise only partially shifting one of both of the representations or shifting both representations.

Processing block 906 is responsible for the "nested" operation between the time domain and the frequency domain. As mentioned at the beginning of the description of FIG. 9, no local or central buffer is used for storing the signals or frames. Therefore, for each signal or frame, it has to be determined whether it is used for the time domain processing or the frequency domain processing. This can be done, for example, by defining a parameter FrameCnt defining which of the signals or frames are used for any of the two (time- or frequency domain processing) and further defining a parameter Interleaving, defining which signal or frame is used for a time domain processing. If, for example, FrameCnt=1 and interleaving with I=5 is set, then each fifth frame is used to execute a calculation in the time domain, i.e., a calculation for the coarse delay. The other frames are used for the calculation of the fine delay in the frequency domain. In other words, block 906 controls, whether the actual signal or frame is used for the time domain processing (steps 902 to 905) or for the frequency domain processing (steps 909 to 913). At block 906 "yes" refers to using the present signal for the time domain processing, whereas "no" refers to using the actual signal or frame for the frequency domain processing.

At step 907, for example, via a Fast-Fourier Transformation (see LYONS, Richard G.: Understanding Digital Signal Processing, Prentice Hall, 2001, in the following referred to as [7]), the phases of the corresponding spectral lines are calculated.

The signals selected for the frequency domain processing are coarse delay corrected (see step 905) so that only a small or fine delay or time difference between a first representation of the actual signal and the second representation of the actual signal remains. The first and the second representation of the actual signal are time-to-frequency transformed, for example via the Fast-Fourier transformation or any other time-to-frequency transformation, for example Discrete Fourier Transformation (DFT) to determine the phases for the spectral lines or frequency bins. Although not shown in FIG. 9, step 907 may further comprise selecting the strongest or most useful frequency bins of the frequency domain representations of the actual signal (see FIG. 6) and to only calculate the phases for the selected frequency bins and to further calculate only for these frequency bins the phase difference for the selected frequency bins.

Alternative embodiments may calculate the phase differences for a plurality or all frequency bins of the first and second frequency domain representation of the actual signal and to perform the consecutive steps 908 to 913 in a corresponding manner.

In step 908, a phase correction of the phase difference values for the selected frequency bins of the actual signal or frame is performed to solve $2\pi$-periodicity ambiguities.

In step 909, it is decided whether enough phase values or phase difference values already exist for a fine delay calculation ("sufficient phase values"). This decision may be performed, for example, by checking whether the number of present or existing phase difference values exceeds a certain predetermined threshold, for example 500, 1000 or 2000 phase different values. In case the sufficiency criterion of block 909 is fulfilled, see "yes", the method continues with step 910. In case the sufficiency criterion is not fulfilled, see "no", the method returns to block 906 to gather further signals or frames to calculate further phase differences (step 907) until the sufficiency criterion of block 909 is fulfilled.

In step 910 offset correction of phase values or phase difference values is executed. This correction may, for example, be realized by a QR fragmentation (see PRESS, William H.; TEUKOLSKY, Saul A.; VERRERLING, William T.; FLANNERY, Brian P.; Numerical Recipes in C. Cambridge University Press, Second Edition 2002, in the following referred to as [2], see GRAMLICH, Gunter; WERNER, Wilhelm: Numerische Mathematik mit MATLAB, dpunkt.verlag, 2000, in the following referred to as [3]). Alternatively to a QR fragmentation or QR decomposition, other decomposition methods, for example QL, LQ decompositions or other linear regression methods can be used to perform the offset correction of the phase difference values.

In step 911, like in the time domain, also in the frequency range an accuracy parameter is calculated, referred to as "β". For example, a means square error calculation may be used to determine the frequency domain accuracy parameter β. The mean square error is a measure for determining how good the linear estimation performed by the QR decomposition or the linear regression method is. In step 912, the fine delay is calculated in the frequency domain.

In processing block 913, the possibility exists to discard the fine delay calculation or accordingly weight the same in the further determination of the complete delay ("β<threshold 2"). As can be seen from FIG. 9, in case the frequency domain accuracy parameter is not below a certain mean square error threshold 2, the process returns to step 907 to calculate further phases and phase differences in the frequency domain. In case the frequency domain accuracy parameter better is greater than the threshold, see "yes", the process or method proceeds to step 914, where finally the complete delay is determined from the fine and the coarse delay ("calculated complete delay from fine and from coarse delay") which describes the relation of the actual receiver pair Rx1 Rx2 to the transmitter TX. In block 915 it is possible to decide whether further complete delay calculations are to be executed ("terminate measurement"), and step 916 refers to the end of the program or method.

In the following, an embodiment of the TDOA-based system according to FIG. 1 and the corresponding communication channel is explained in detail. FIG. 10 shows a sequence diagram of the communication between the central or central unit 100 and the respective receivers Rx1 to Rx3, which can also be referred to as remote stations. In FIG. 10, for reasons of clarity, the interleaving of the time and frequency domain, i.e., the corresponding loop constructs, are omitted.

As can be seen from FIG. 10, at the beginning, the central starts (1001) the TDOA determination by sending a direction finding request or a direction finding job to the receivers Rx to be included into the time division determination. The direction finding request specifies the receivers and the corresponding frequency and bandwidth. Upon reception of the direction finding request, the addressed receivers start time synchronously measuring the corresponding frequency and bandwidth (1002). Each receiver calculates the predictor coefficients and the corresponding signal to noise ratio (1003) and transmits the predictor coefficients and the associated signal to noise ratios (SNR) to the central (1004). The central selects the predictor coefficients having the largest signal to noise ratio (1005) and transmits the selected predictor coefficients (1006) to the receivers. Each of the receivers calculates the residual of the representation of the signal it received based on the selected predictor coefficients to obtain the residual presentation of the signal (1007). The residual is further quantized and entropy encoded to obtain a quantized and entropy encoded residual representation of the signal (1008) which each receiver transmits to the central (1009). The central unit decodes the residual, calculates the cross correlation between the decoded residual representations of the receivers (pair wise) and determines a coarse delay for each receiver pair (1010). Further, the central calculates the accuracy parameter α (1011) and conducts a coarse delay correction at one of the two decoded residual representations according to the calculated coarse delay (1012).

If the accuracy parameter fulfils the predetermined condition, the central transmits a request to switch to the frequency domain (1013), and the receivers calculate the indices or frequency band with the strongest spectral lines (1014). The receivers transmit (1015) the indices with the strongest spectral lines (for each frame) to the central unit, which calculates the intersections of the spectral line indices received from the various receivers (1016) and requests the corresponding spectral lines (1017) from the receivers. The receivers, upon reception of the request from the central, quantize the requested spectral lines associated to the representation of the actual signal (1018) and transmit the quantized spectral lines to the central (1019). Based on the quantized spectral lines received from the receivers, the central calculates the phase differences including the phase differences correction (1020) and conducts a phase correction for the phase differences (1021). The central unit further calculates the accuracy parameter β (1022) and the fine delay (1023). Finally, the central unit calculates the complete delay (1024) based on the coarse delay and the fine delay and outputs the delay (1025), for example for determining a hyperboloid for the specific receiver pair.

TDOA systems according to FIGS. 8 to 10 may use the remote receivers Rx1 to Rx3 as shown in FIG. 1, which use GPS as a timing reference and which perform the processing, for example using a personal computer (PC), at each receiver. A UMTS or a DSL connection may be used to connect the remote receivers via, for example, a virtual private network (VPN) to the central station 100. At the receivers Rx1 to Rx3 no local caching is performed. Therefore, the system is limited to signals that are in there long enough for a measurement to be initiated and completed. Tests with this TDOA system have shown an accuracy in the order of 0.05 samples and necessitating between 100.000 and 1.000.000 samples of the signal to yield a reliable result. Such embodiments work down to 6.25 KHz white signals with analogue modulation as, for example, used for aeronautical ATIS signals.

By utilizing quantization stages and entropy encoding, the proposed method may be adapted optimally to the respective transmission medium and of the directorial transmission channel.

Figure 11C:
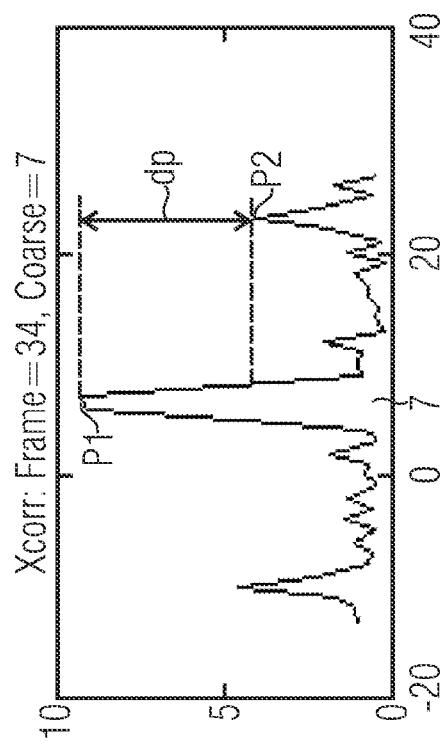
FIGS. 11A to 11J show various MATLAB diagrams illustrating the different intermediate results of a method according to FIG. 8.
Figure 11D:
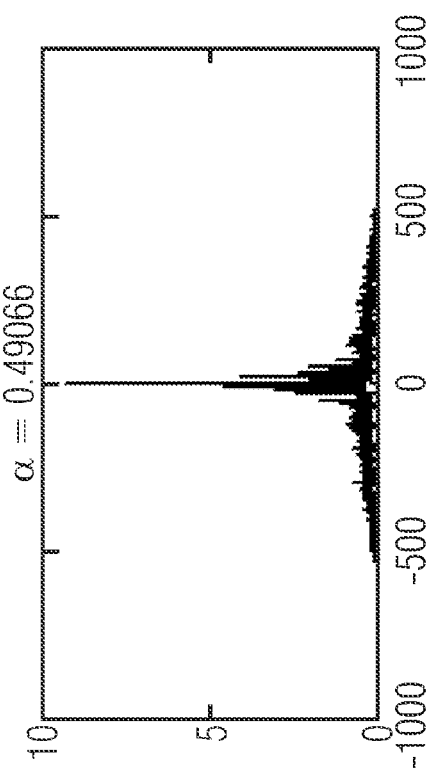
Figure 11A:
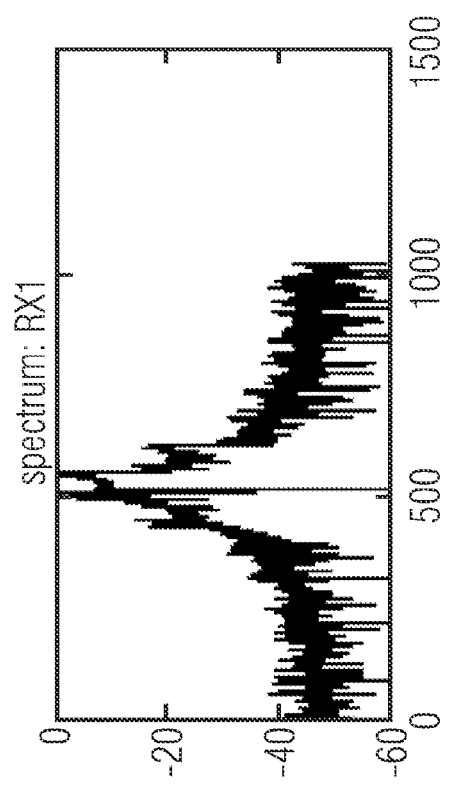
Figure 11B:
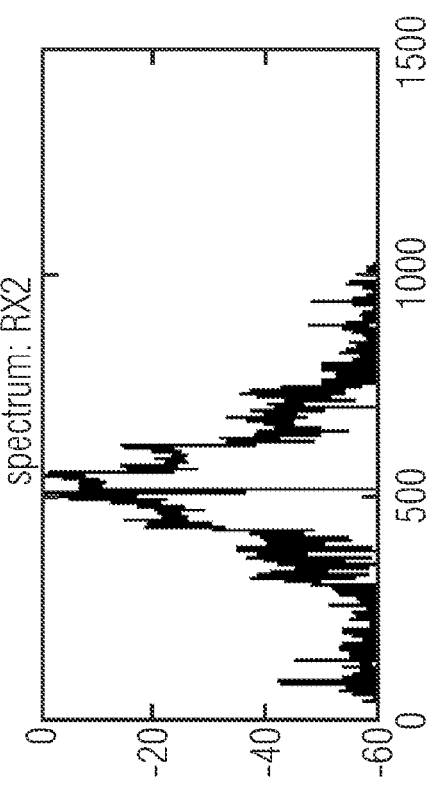
Figure 11E:
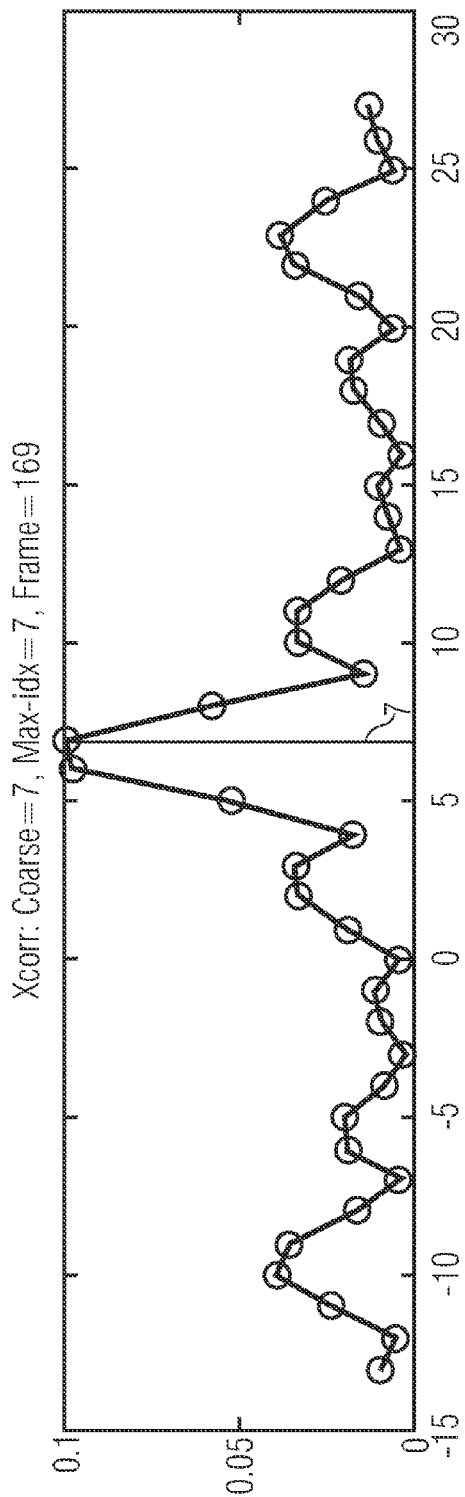
Figure 11G:
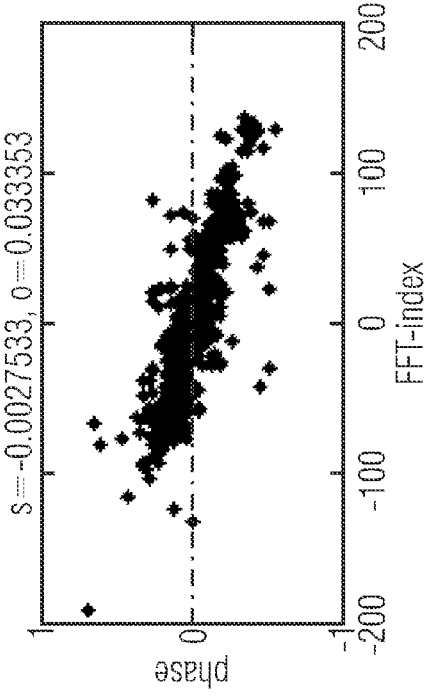
Figure 11F:
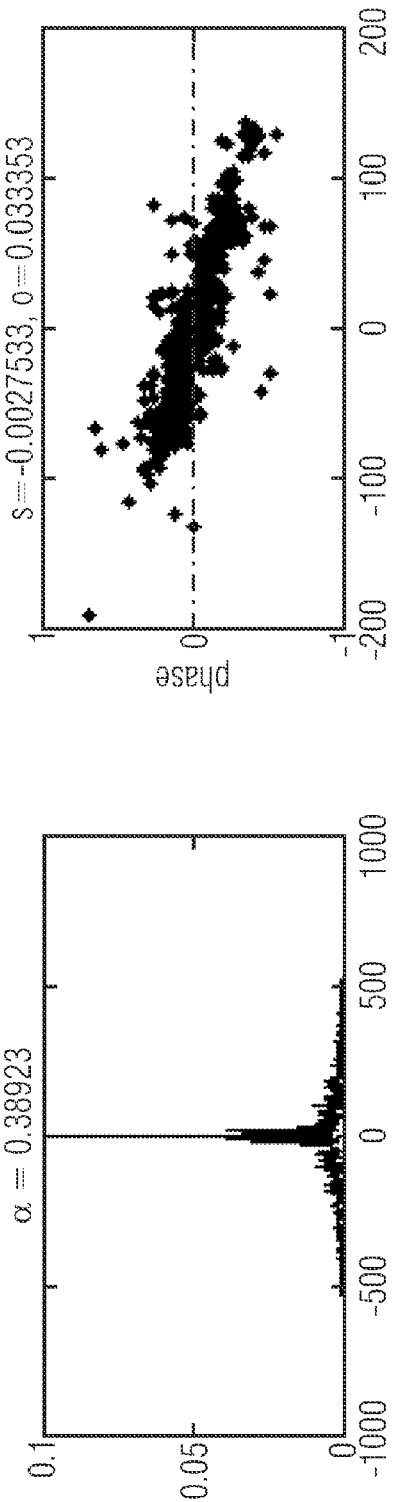
Figure 11H:
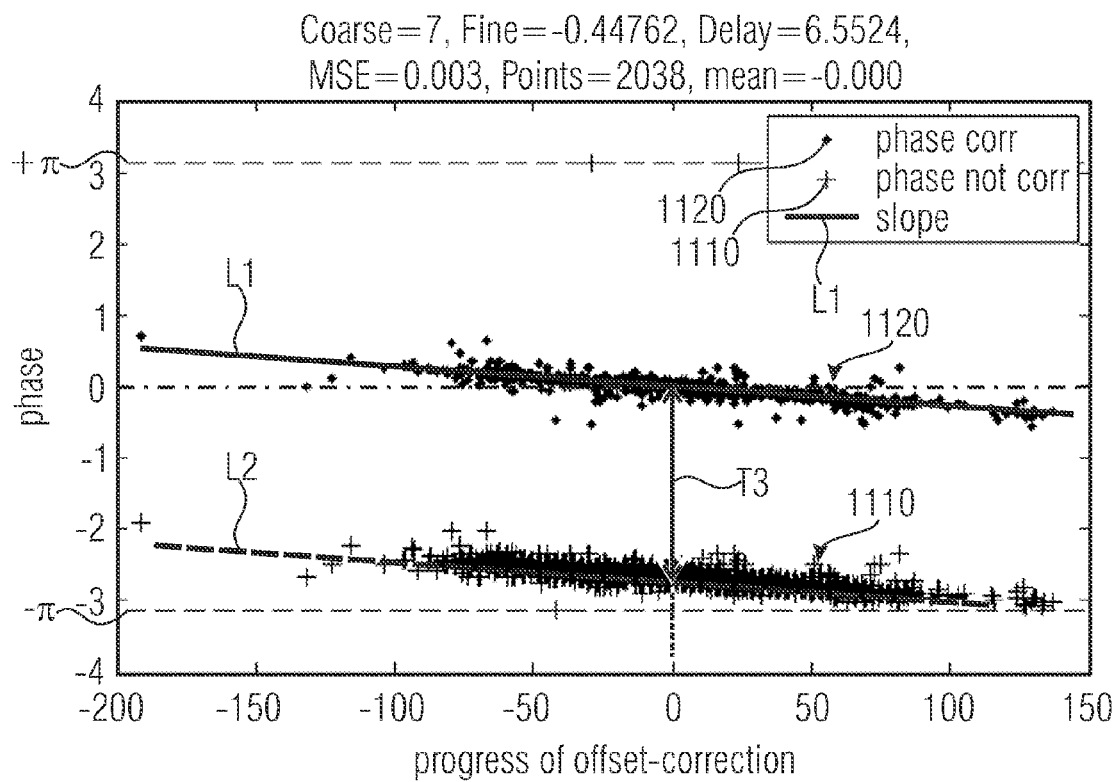
Figure 11I:
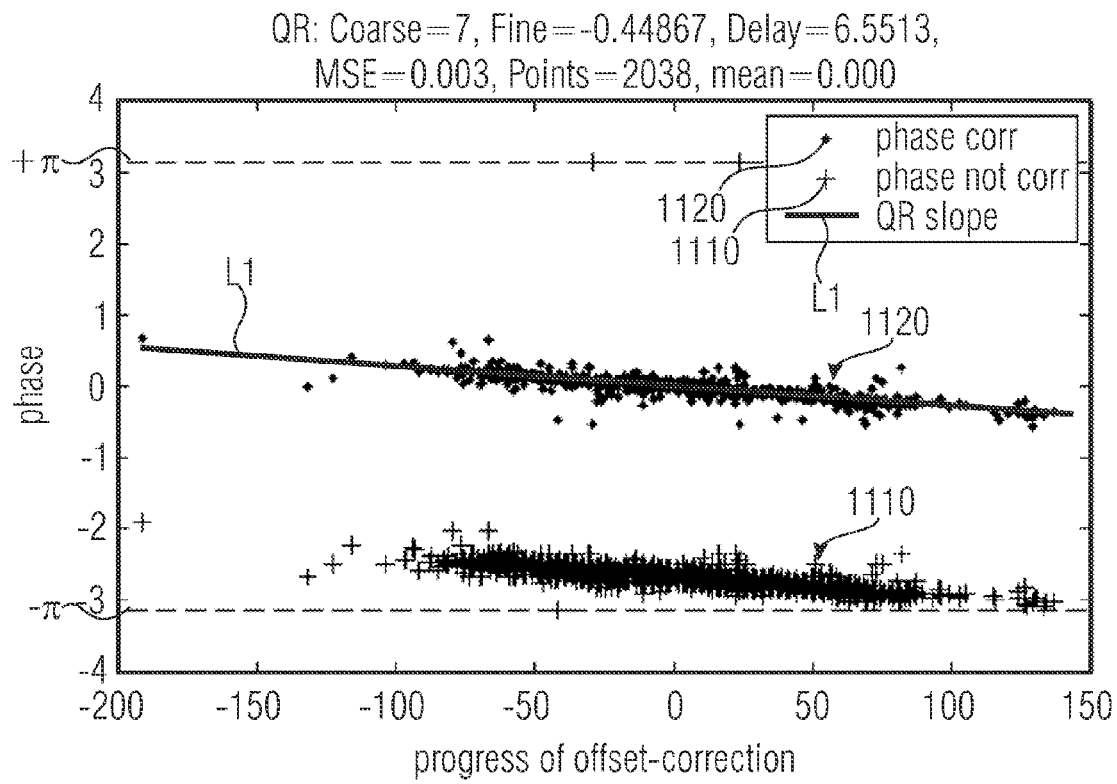
Figure 11J:
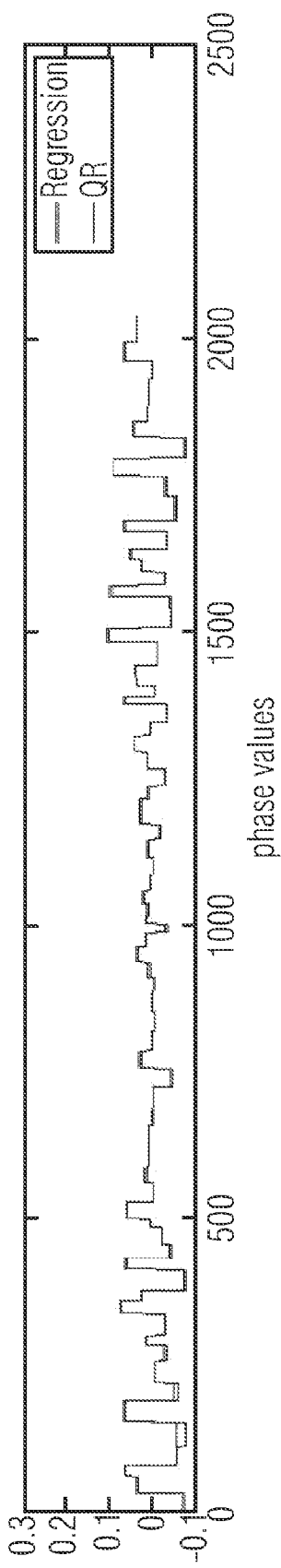

In the following, based on FIGS. 11A to 11J showing diagrams of intermediate results for an implementation of the TDOA direction finder according to FIGS. 8 to 9 will be explained. FIG. 11A shows the spectrum of the first receiver Rx1 in dB over the frequency indices and FIG. 11B shows the spectrum of the second receiver Rx2 in dB over the frequency indices. FIG. 11C shows the result of the cross correlation of the first and second time domain representation for frame 34. As can be seen from FIG. 11C, the peak of the cross correlation is at seven, or in other words, from FIG. 11C a coarse delay of seven samples was calculated. In FIG. 11D the accuracy value $\alpha$ with $\alpha=0.49066$ is shown, at which a first change into the frequency domain was executed. In FIGS. 11E to 11G a continuous state of the frequency and time domain evaluation is illustrated. Similar to FIG. 11C, FIG. 11E shows the peak of the cross correlation at the seventh sample for frame 169, i.e., a coarse delay of seven samples. As can be seen further from FIG. 11F, in the course of time, i.e., due to the various iterations, the accuracy parameter $\alpha$ developed even more favorable to alpha=0.38923. In FIG. 11G it can be seen further that in frame 170, for the respective interleaving block, already 2038 phase values or phase difference values exist in a range of the FFT-indices ranging from minus 200 to plus 200. The phase difference values of FIG. 11G are already offset corrected. FIGS. 11H and 11I represent the correction of the complete delay. FIG. 11H shows the calculation executed via a regression line and FIG. 11I shows the calculation via a QR decomposition. A slightly different delay calculation result, which may be seen in the third decimal place, see the fine delay of FIG. 11H (fine=$-0.44762$), resulting in a complete delay of 6.5524 samples by adding the coarse delay (coarse=7) and the fine delay. Whereas the fine delay obtained via the QR decomposition in FIG. 11I shows a fine delay of fine=$-0.44867$, a coarse delay of 7 and, correspondingly a complete delay of 6.5513. The mean square error for both regressions is MSE=0.003. In FIG. 11J, the course of the offset correction may be seen across the 2038 phase values. As can be seen, the offset correction via a regression line only slightly deviates from the offset correction via the QR decomposition. In all cases, it holds true, however, that the offset correction via the QR decomposition is never verse than the offset correction via the regression line.

Figure 12A:
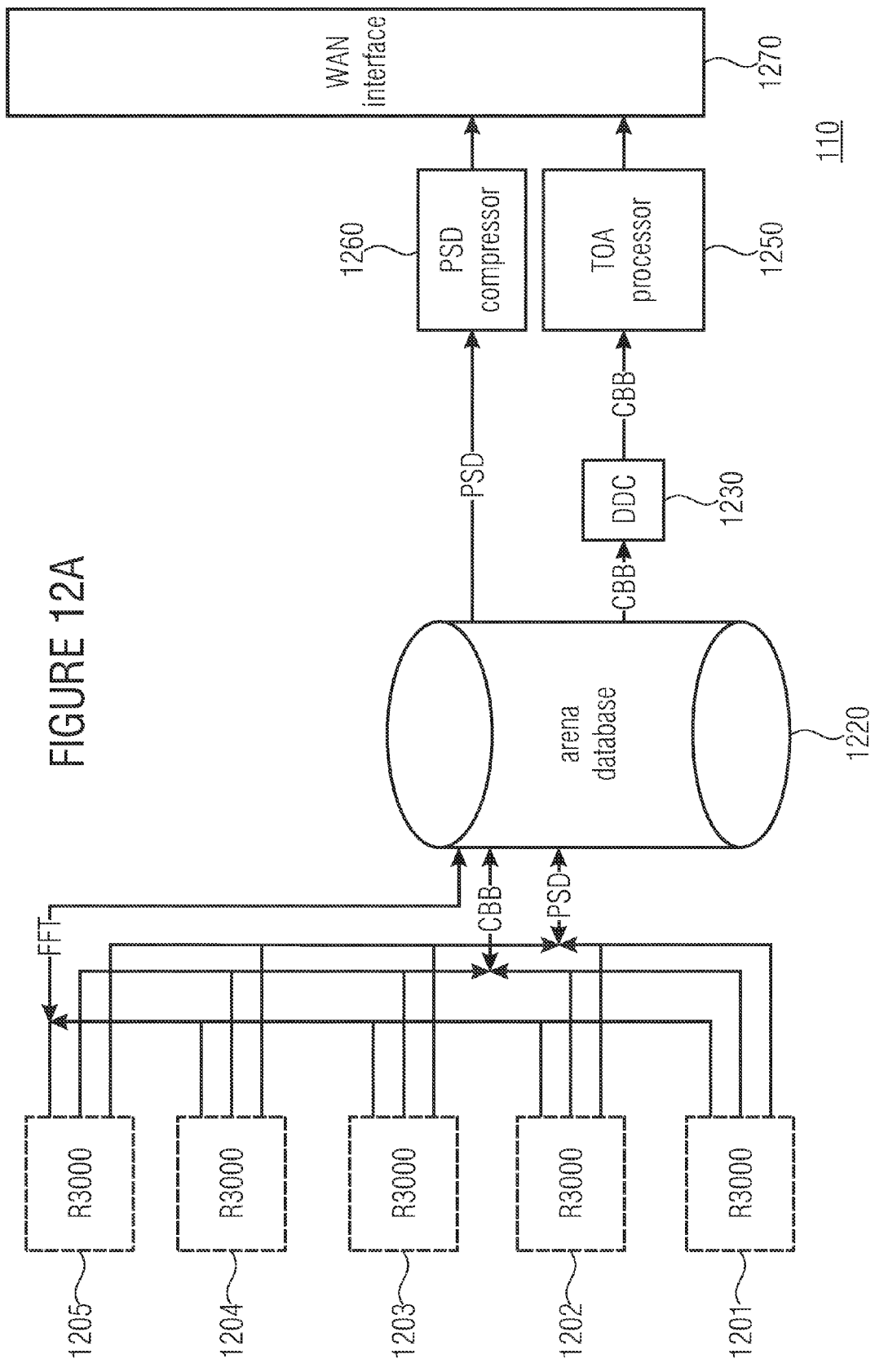
FIG. 12A shows a block diagram of an embodiment of a receiver station for TDOA-based position-finding system comprising a buffer database.

FIG. 12A shows a block diagram of an embodiment of a receiver Rx1 or 110 with local caching or buffering. Without local caching at the receivers, the usability of TDOA systems is limited as mentioned before, as in practice only continuous or virtually continuous signals can be located. Intermittent signals or short bursts, even if they were ideally suited for TDOA cannot be processed due to the time necessitated for a central station to identify the signal and set up the remote stations accordingly.

Therefore, further embodiments of the TDOA system and of the systems and methods for determining a time difference cache the signal locally at every remote receiver with up to 20.5 MHz bandwidth. FIG. 12A shows a receiver or a receiver station 110 comprising five receiver elements 1201 to 1205, a database 1220, a digital down converter (DDC) 1230, a TOA processor 1250, a power spectral density (PSD) compressor 1260 and a WAN (wide area network) interface 1270. The receiver 1201 is, for example, coupled to the data base 1220 for providing complex base band (CBB) data or signals and power spectrum density (PSD) data to the data base and FFT data to the data base 1220.

The caching is performed by a database, in FIG. 12A referred to as "Arena database" 1220 which allows to access individual signals via a single or multiple digital down converters (DDC) even while the recording of further samples continues. Local caching at the receivers allows for maximum exploitation of the received signal including for, e.g., clicks caused by transmitter keying. As can be seen from FIG. 12A, each receiver is connected to an antenna element and produces PSD (power spectral density data), FFT (Fast Fourier Transformation) data and CBB (complex base band, i.e., I/Q data of the received signal, i.e., the first or second representation of the signal. The data is organized in frames and time stamps that describe the point in time the frame was received.

The complex base band data and the power spectral density data are buffered in the data base with allows for accessing stored data while new data keeps coming in. The PSD data is compressed. When the central station necessitates a TDOA location finding for a signal, the data base will produce the original complex base band streams of the relevant time span and a digital down converter will extract the requested frequency range. The DDC will perform, e.g., a digital mixing with a consecutive filtering and digitization of the signals or a fast convolution in the frequency domain. The TOA processor (time of arrival) extracts the data most relevant for the TOA estimation and sends it to the central station via the WAN-interface. In certain embodiments, the TOA processor 1250 will perform some or all steps of the time domain and frequency domain processing as described based on the other figures.

In other words, an embodiment proposed or the position finding based on TDOA comprises a central and several (at least 3) remote stations 110 to 130 or receivers having one GPS connection each. There is also the possibility of realizing the center at a receiver.

Each receiver 110 to 130 has a bidirectional communication channel to the central via which control information and data is exchanged. The bidirectional communication channel may be line conducted (e.g. Ethernet), non-line-conducted (e.g. UMTS) or implemented as another conventional communication medium. First of all, the center only requests spectrums of different frequency ranges from the individual receivers. If a transmitter is to be found or localized, the center directs all receivers to start on the corresponding frequency and bandwidth synchronously in time. Then, the delays are calculated by the receivers in pairs from the data transmitted to the center. For example, the delay between receivers 110 Rx1 and 120 Rx2 is represented as follows:

$$Delay12 = T1 - T2$$

$$Delay21 = T2 - T1$$

Accordingly, the delay is calculated for all receiver pairs. In the following illustration, three receiver pairs are present (1+2, 1+3 and 2+3). After the delays of the individual receiver pairs have been calculated, to each receiver pair, from its location calculated via the GPS connection and the calculated delay, a hyperbola is allocated (see GUSTAFSSON, Fredrik; GUNNARSSON, Fredrik: Positioning using Time-Difference of Arrival Measurements, Sweden, Linköping University, in the following referred to as [4]). By calculating the hyperbola intersections, based on the time differences of arrival (TDOA) and the GPS positions of the receivers the position of the transmitter may be calculated and illustrated on a map. How the calculations are executed in detail is explained in more detail below.

To each receiver pair, as already mentioned above, using the GPS position and the calculated delay, a hyperbola may be allocated. To calculate the position of an emitter, at least two different hyperbolas are necessitated. With 3 receivers, already three hyperbolas may be calculated. Here, one could possibly exclude a non-optimum hyperbola from the calculation. The intersections of the hyperbolas are calculated via a Newton iteration using Jacobi matrices (see OSTERMANN, Alexander: Angewandte Mathematik für Lehramtsstudierende, Universitat Innsbruck, Institut Mathematik, Skriptum zur Vorlesung im Sommersemester 2008, in the following referred to as [5]). Two problems arise here. On the one hand, a Newton iteration only works well when exactly the right starting point is selected, and on the other hand, from errors in the delay calculation inaccuracies result and, consequently, ambiguities regarding the intersection. The first problem is solved by using the intersections of the asymptotes for starting the Newton iteration. The ambiguities are counteracted by a least means square algorithm.

Figure 12B:
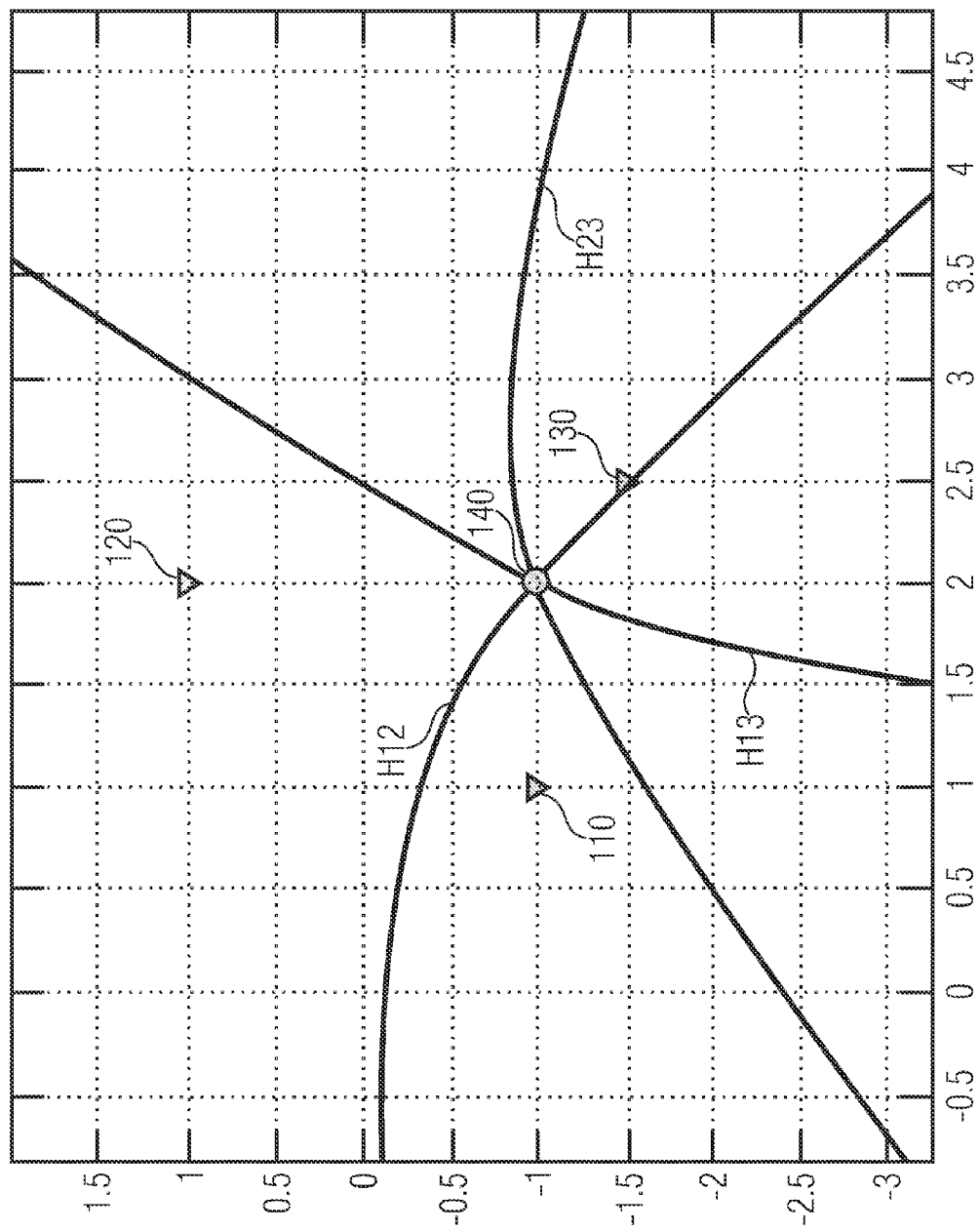
FIG. 12B shows an exemplarily TDOA-based position finding based on the hyperbolas determined for three receiver pairs.

In FIG. 12B, the operation of a hyperbola intersection algorithm is illustrated. Here, only the relevant hyperbola branches of three receiver pairs are illustrated, wherein H12 refers to the hyperbola derived from the TDOA for the receiver pair 110/120, wherein H13 refers to the hyperbola derived from the TDOA for the receiver pair 110/130, and wherein H23 refers to the hyperbola derived from the TDOA for the receiver pair 120/130. The triangles describe the position of the receivers and the circle represents the calculated position of the emitter 140.

Further embodiments of the present invention include a method for position finding of transmitters, wherein the method operates in the time/frequency range in an nested way. In the time range, the coarse delay is calculated and corrected accordingly and in the frequency range the fine delay is determined.

Further developments of the embodiments comprise using at the remote receiver stations the linear predictor coefficients with the greatest signal/noise distance in the system. Further embodiments comprise calculating the cross correlation based on residual signals. Further embodiments comprise quantizing and entropy-encoding the residual signals for determining the coarse delay to execute a data reduction (by quantification and entropy encoding a scalable adaption to the respective transmission medium is possible).

Further embodiments comprise deriving both in the time and also in the frequency domain reliability or accuracy parameters for subsequent decisions.

Further embodiments comprise using only the strongest FFT lines for calculating the fine delay and/or quantizing the FFT lines used for determining the fine delay. Even further embodiments comprise a phase calculation with a subsequent phase correction.

Embodiments may use a QR fragmentation or a regression line for offset correction to be able to determine the fine delay.

For position finding, embodiments may use a multi-dimensional Newton iteration to determine intersections of hyperbolas and that ambiguities resulting from same are e.g. minimized via an LMS (Least Mean Square) algorithm, and using as starting point for the Newton iteration the intersections of the asymptotes.

Depending on certain implementation requirements, embodiments of the invention can be implemented in hardware or in software. The implementation can be performed using a digital storage medium, for example, a floppy disc, a DVD, a Blue-Ray, a CD, a ROM, a PROM, an EPROM, an EEPROM or a FLASH memory having electronically-readable control signals stored thereon, which co-operate (or are capable of incorporating) with a programmable computer system such that the respective method is performed. Therefore, the digital storage medium may be a computer-readable storage medium.

Some embodiments according to the invention comprise a data carrier having electronically readable control signals, which are capable of co-operating with a programmable computer system, such that one of the methods described herein is performed.

Generally, embodiments of the present invention can be implemented as a computer program product with a program code, the program code being operative for performing one of the methods when the computer program product runs on a computer. The program code may be, for example, stored on a machine-readable carrier.

Other embodiments comprise the computer program for performing one of the methods described herein stored on a machine-readable carrier.

In other words, an embodiment of the inventive method is, therefore, a computer program having a program code for performing one of the methods described herein when the computer program runs on a computer.

A further embodiment of the inventive method is, therefore, a data carrier (or a digital storage medium or a computer-readable medium) comprising, recorded thereon, the computer program for performing one of the methods described herein.

A further embodiment of the inventive method is, therefore, a datastream or a sequence of signals representing the computer program for performing one of the methods described herein. The datastream or the sequence of signals may, for example, be configured to be transferred via a data communication connection, for example, via the Internet.

Yet a further embodiment comprises a processing means, for example, a computer or a programmable logic device, configured to or adapted to perform one of the methods described herein.

A further embodiment comprises a computer having stored thereon a computer program for performing one of the methods described herein.

In some embodiments, a programmable logic device (for example, a field programmable gate array) may be used to perform some or all of the functionalities of the method described herein. In several embodiments, a field programmable gate array may incorporate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for determining a time difference between times of arrival of signals at a first receiver and at a second receiver, wherein the first receiver and the second receiver are positioned at different locations, comprising:
receiving a first representation of a first signal at a first time of arrival at the first receiver;
receiving a second representation of the first signal at a second time of arrival at the second receiver;
correlating at least a first time-domain representation of the first signal derived from the first representation of the first signal and a second time-domain representation of the first signal derived from the second representation of the first signal to acquire a first time difference information or correlating at least a first time-domain representation of a second signal derived from a first representation of the second signal received at the first receiver at a third time of arrival and a second time-domain representation of the second signal derived from a second representation of the second signal received at the second receiver at a fourth time of arrival, to acquire the first time difference information;
evaluating a phase difference relation between at least a first frequency-domain representation of the first signal derived from the first representation of the first signal and a second frequency-domain representation of the first signal derived from the second representation of the first signal to acquire a second time difference information; and
determining the time difference between the first time of arrival of the first signal and the second time of arrival of the first signal based on the first time difference information and the second time difference information, or determining the time difference between the third time of arrival of the second signal and the fourth time of arrival of the second signal based on the first time difference information and the second time difference information, if the first time difference information is acquired by correlating the first and second time-domain representations of the second signal.

2. The method of claim 1, wherein the first time difference information is acquired by correlating the first time-domain representation and the second time-domain representation of the first signal, the method further comprising:
shifting the first time-domain representation of the first signal and/or the second time-domain representation of the first signal based on the first time difference information such that a remaining time difference is reduced;
deriving the first frequency-domain representation by time-frequency transforming the shifted first time-domain representation in case the first time-domain representation has been shifted; and/or
deriving the second frequency-domain representation of the first signal by time-frequency transforming the shifted second time-domain representation in case the second time-domain representation has been shifted.

3. The method of claim 2, wherein either the first time-domain representation is shifted by the first time difference information, the second time-domain representation is shifted by the first time difference information, or the first time-domain representation and the second time-domain representation are shifted in total by the first time difference information.

4. The method of claim 1, wherein the first time difference information is acquired by correlating the first time-domain representation and the second time-domain representation of the first signal, and wherein the time difference between the first time of arrival and the second time of arrival of the first signal is determined by adding the first time difference information and the second time difference information, or by adding the time information derived from the first time information and the second time information.

5. The method of claim 1, wherein the first time difference information is acquired by correlating the first time-domain representation and the second time-domain representation of the first signal, and wherein the first time-domain signal is a first residual signal acquired by linear prediction encoding the first representation of the first signal and the second domain representation is a second residual signal acquired by linear prediction encoding the second representation of the first signal.

6. The method of claim 5, comprising:
determining a set of linear prediction encoding coefficients based on the first representation of the first signal; and
linear prediction encoding the first representation and the second representation of the first signal using the set of linear prediction encoding coefficients.

7. The method of claim 5, comprising:
determining a first set of linear prediction encoding coefficients based on the first representation of the first signal and determining a corresponding signal-to-noise ratio for the first residual acquired by linear prediction encoding the first signal using the first set of linear prediction encoding coefficients;
determining a second set of linear prediction encoding coefficients based on the second representation of the first signal and determining a corresponding signal-to-noise ratio for the second residual acquired by linear prediction encoding the second representation using the second set of linear prediction encoding coefficients;
comparing the signal-to-noise ratio for the first residual and the signal-to-noise ratio for the second residual; and
linear prediction encoding the first representation and the second representation of the first signal using the first set of linear prediction coefficients in case the signal-to-noise ratio associated to the first residual is larger than the signal-to-noise ratio associated to the second residual.

8. The method of claim 1, wherein the first time difference information is acquired by correlating the first time-domain representation and the second time-domain representation of the first signal, the method comprising:
determining a first sub-set of frequency bins of the first frequency-domain representation by evaluating at least one of magnitudes and power values associated to the frequency bins;
determining a second sub-set of frequency bins of the second frequency-domain representation by evaluating at least one of magnitudes and power values associated to the frequency bins;
comparing the first sub-set of frequency bins and the second sub-set of frequency bins and defining a third sub-set of frequency bins, which only comprises frequency bins that are comprised in the first and the second sub-set of frequency bins; and
acquiring the second time difference information based on evaluating a phase difference relation of the frequency bins of the first frequency-domain representation and the second frequency-domain representation comprised in the third sub-set of frequency bins.

9. The method of claim 8, wherein the determining of the first sub-set of frequency bins comprises:
- comparing the magnitudes or energy values of the frequency bins of the first frequency domain representation and selecting a predetermined number of frequency bins with the largest magnitudes for the first sub-set of frequency bins, or
- comparing a magnitude or energy value associated to a frequency bin of the first frequency domain representation and assigning the frequency bin to the first sub-set of frequency bins in case the magnitude of the frequency bin is greater than a predetermined threshold.

10. The method of claim 1, wherein the first time difference information is acquired by correlating the first time-domain representation and the second time-domain representation of the first signal, and wherein the time difference is determined based on a plurality of signals comprising the first signal, the method comprising:
- receiving for each signal of the plurality of signals a respective first representation and second presentation of the signal;
- deriving for each signal of the plurality of signals from the first and second representation of the signal a pair of a first frequency-domain representation and a second frequency-domain representation of the respective signal;
- deriving for at least some pairs of the plurality of first and second frequency-domain representation pairs for at least a plurality of frequency bins a phase difference associated to the respective frequency bin and pair of first and second frequency domain representation; and
- acquiring the second time difference information by evaluating a statistical relationship between the at least some pairs of frequency bins and associated phase differences.

11. The method of claim 10, comprising:
- determining a graph defining a linear statistical relationship between the pairs of frequency bins and associated phase differences; and
- subtracting a bias of the graph from each of the phase differences to acquire offset corrected versions of the phase differences associated to the frequency bins.

12. The method of claim 10, comprising:
- determining a graph defining a linear statistical relationship between the pairs of frequency bins and associated phase differences; and
- determining the second time difference information based on an inclination of the graph.

13. The method of claim 1, wherein the first time difference information is acquired by correlating the first time-domain representation and the second time-domain representation of the first signal, the method further comprising:
- storing the first representation of the first signal at the first receiver together with the first time of arrival associated to the first representation of the first signal and deriving the first time-domain signal and/or the first frequency-domain signal from the stored first representation, and storing the second representation at the second receiver together with the first time of arrival associated to the first representation of the first signal and deriving the second time-domain representation and/or the second frequency-domain representation from the stored second representation.

14. The method of claim 13, wherein the first representation is stored using a time-domain representation of the first representation or using a frequency-domain representation of the first representation and wherein the second representation is stored using a time-domain representation or using a frequency-domain representation of the first representation.

15. The method of claim 1, wherein the first time difference information is acquired by correlating the first and second time-domain representations of the second signal, and wherein the first representation and the second representation of the first signal are not used for determining the first time information, and wherein the first representation and the second representation of the second signal are not used for determining the second time information.

16. A system for determining a time difference between times of arrival of signals at a first receiver and at a second receiver, wherein the first and the second receivers are positioned at different locations, comprising:
- the first receiver adapted to receive a first representation of a first signal at a first time of arrival;
- the second receiver adapted to receive a second representation of the first signal at a second time of arrival; and
- a central unit adapted to:
- correlate at least a first time-domain representation of the first signal derived from the first representation of the first signal and a second time-domain representation of the first signal derived from the second representation of the first signal to acquire a first time difference information or correlate at least a first time-domain representation of a second signal derived from a first representation of the second signal received at the first receiver at a third time of arrival and a second time-domain representation of the second signal derived from a second representation of the second signal received at the second receiver at a fourth time of arrival, to acquire the first time difference information;
- evaluate a phase difference relation between at least a first frequency-domain representation of the first signal derived from the first representation of the first signal and a second frequency-domain representation of the first signal derived from the second representation of the first signal; and
- determine the time difference between the first time of arrival of the first signal and the second time of arrival of the first signal based on the first time difference information and the second time difference information, or determining the time difference between the third time of arrival of the second signal and the fourth time of arrival of the second signal based on the first time difference information and the second time difference information, if the first time difference information is acquired by correlating the first and second time-domain representations of the second signal.

17. A method for finding a position of a transmitter transmitting a signal, comprising:
- using the method according to claim 1 to determine the time difference between times of arrival of representations of a signal at the first receiver and the second receiver;
- using the method according to claim 1, wherein the second receiver is replaced by a third receiver, to determine the time difference between times of arrival of representations of the signal at the first receiver and the third receiver; and
- finding the position of the transmitter by performing a multi-lateration algorithm using the time difference between the times of arrival of representations of the signal at the first receiver and the second receiver and the time difference between the times of arrival of representations of the signal at the first receiver and the third receiver.

18. A system for finding a position of a transmitter transmitting a signal, comprising:

a system for determining a time difference between times of arrival of signals at a first receiver and at a second receiver, wherein the first and the second receivers are positioned at different locations, comprising:
- the first receiver adapted to receive a first representation of a first signal at a first time of arrival;
- the second receiver adapted to receive a second representation of the first signal at a second time of arrival; and
- a central unit adapted to:
- correlate at least a first time-domain representation of the first signal derived from the first representation of the first signal and a second time-domain representation of the first signal derived from the second representation of the first signal to acquire a first time difference information or correlate at least a first time-domain representation of a second signal derived from a first representation of the second signal received at the first receiver at a third time of arrival and a second time-domain representation of the second signal derived from a second representation of the second signal received at the second receiver at a fourth time of arrival, to acquire the first time difference information;
- evaluate a phase difference relation between at least a first frequency-domain representation of the first signal derived from the first representation of the first signal and a second frequency-domain representation of the first signal derived from the second representation of the first signal; and
- determine the time difference between the first time of arrival of the first signal and the second time of arrival of the first signal based on the first time difference information and the second time difference information, or determining the time difference between the third time of arrival of the second signal and the fourth time of arrival of the second signal based on the first time difference information and the second time difference information, if the first time difference information is acquired by correlating the first and second time-domain representations of the second signal, adapted to determine the time difference between times of arrival of representations of a signal at the first receiver and the second receiver and adapted to determine the time difference between times of arrival of representations of the signal at the first receiver and a third receiver,
- wherein the central unit is further adapted to find the position of the transmitter by performing a multi-lateration algorithm using the time difference between the times of arrival of representations of the signal at the first receiver and the second receiver and the time difference between the times of arrival of the representations of the signal at the first receiver and the third receiver.

19. A non-transitory computer readable medium including a computer program for performing, when running on a computer or a processor, a method for determining a time difference between times of arrival of signals at a first receiver and at a second receiver, wherein the first receiver and the second receiver are positioned at different locations, the method comprising:
- receiving a first representation of a first signal at a first time of arrival at the first receiver;
- receiving a second representation of the first signal at a second time of arrival at the second receiver;
- correlating at least a first time-domain representation of the first signal derived from the first representation of the first signal and a second time-domain representation of the first signal derived from the second representation of the first signal to acquire a first time difference information or correlating at least a first time-domain representation of a second signal derived from a first representation of the second signal received at the first receiver at a third time of arrival and a second time-domain representation of the second signal derived from a second representation of the second signal received at the second receiver at a fourth time of arrival, to acquire the first time difference information;
- evaluating a phase difference relation between at least a first frequency-domain representation of the first signal derived from the first representation of the first signal and a second frequency-domain representation of the first signal derived from the second representation of the first signal to acquire a second time difference information; and
- determining the time difference between the first time of arrival of the first signal and the second time of arrival of the first signal based on the first time difference information and the second time difference information, or determining the time difference between the third time of arrival of the second signal and the fourth time of arrival of the second signal based on the first time difference information and the second time difference information, if the first time difference information is acquired by correlating the first and second time-domain representations of the second signal.

20. A non-transitory computer readable medium including a computer program for performing, when running on a computer or a processor, a method for finding a position of a transmitter transmitting a signal, the method comprising:
- using the method according to claim 1 to determine the time difference between times of arrival of representations of a signal at the first receiver and the second receiver;
- using the method according to claim 1, wherein the second receiver is replaced by a third receiver, to determine the time difference between times of arrival of representations of the signal at the first receiver and the third receiver; and
- finding the position of the transmitter by performing a multi-lateration algorithm using the time difference between the times of arrival of representations of the signal at the first receiver and the second receiver and the time difference between the times of arrival of representations of the signal at the first receiver and the third receiver.

* * * * *